(12) United States Patent
Tippett

(10) Patent No.: US 9,097,243 B2
(45) Date of Patent: Aug. 4, 2015

(54) APPARATUS AND METHOD FOR GYROSCOPIC PROPULSION

(71) Applicant: Raymond Kelly Tippett, Mesa, AZ (US)

(72) Inventor: Raymond Kelly Tippett, Mesa, AZ (US)

(73) Assignee: GANID Corp, Mesa, AZ (US)

( * ) Notice: Subject to any disclaimer, the term of this patent is extended or adjusted under 35 U.S.C. 154(b) by 94 days.

(21) Appl. No.: 14/071,410

(22) Filed: Nov. 4, 2013

(65) Prior Publication Data

US 2015/0122057 A1    May 7, 2015

(51) Int. Cl.
*G01C 19/06* (2006.01)
*F03G 3/08* (2006.01)

(52) U.S. Cl.
CPC ........................................ *F03G 3/08* (2013.01)

(58) Field of Classification Search
CPC ...................................... F03G 3/00; F03G 3/08
USPC .................. 74/5.22, 5.37, 5.4, 5.46, 5.34, 5.7
See application file for complete search history.

(56) References Cited

U.S. PATENT DOCUMENTS

| | | | | |
|---|---|---|---|---|
| 2,857,122 A * | 10/1958 | Maguire | ......................... | 244/93 |
| 2,972,892 A * | 2/1961 | Carter | ........................... | 74/5.37 |
| 3,056,303 A * | 10/1962 | Naylor | ........................... | 74/5.34 |
| 3,424,401 A * | 1/1969 | Maurer | ........................ | 244/165 |
| 5,871,249 A * | 2/1999 | Williams | .................... | 294/86.41 |
| 6,232,671 B1 * | 5/2001 | Gottfried, Jr. | ................. | 290/1 R |
| 6,568,291 B1 * | 5/2003 | Inman | ............................ | 74/5.34 |
| 7,121,159 B2 * | 10/2006 | Tippett | ........................... | 74/5.46 |
| 8,234,943 B2 * | 8/2012 | Peng et al. | .................... | 74/5.37 |
| 2006/0032985 A1 * | 2/2006 | Smith et al. | ................... | 244/165 |

\* cited by examiner

*Primary Examiner* — Justin Krause
(74) *Attorney, Agent, or Firm* — Wright Law Group, PLLC; Mark F. Wright

(57) ABSTRACT

Three spinning ring rotors, functioning as concentric ring gyro motors, are angled at ninety degrees with respect to one another and are arranged in an orthogonal association inside a substantially spherical housing that includes a central hub with a plurality of spokes attached to the spherical housing with holes for the spokes and coils used for steering. The mass distribution for the rings is such that the rotating ring masses are maximized and the containing mass is minimized. There is minimum friction for the primary rotation of the spinning ring rotors with all other angular forces translated across the containment structures uniformly. These spinning masses remain equal, unless the influence of precisely controlled and oriented destabilizing steering coils are used to disrupt the stability of one or more rotors by placing a controllable and varying magnetic field, from weak to strong, parallel to the axis of the spinning rotors.

19 Claims, 46 Drawing Sheets

APPARATUS AND METHOD FOR GYROSCOPIC PROPULSION

RELATED APPLICATIONS

This patent application is a continuation in part of U.S. patent application Ser. No. 13/567,030, which application is now pending and which application was filed on Aug. 4, 2012. U.S. patent application Ser. No. 13/567,030 is a divisional of U.S. patent application Ser. No. 12/136,047, filed on Jun. 9, 2008, which application is now issued as U.S. Pat. No. 8,234,943 and which application is a continuation in part of U.S. patent application Ser. No. 11/581,809, filed on Oct. 16, 2006, which application is now issued as U.S. Pat. No. 7,383,747 and which application is a divisional of U.S. patent application Ser. No. 10/770,795, filed on Feb. 3, 2004, which application is now issued as U.S. Pat. No. 7,121,159 and which application is a continuation-in-part of U.S. patent application Ser. No. 10/087,430, filed on Mar. 1, 2002, now issued as U.S. Pat. No. 6,705,174, all of which are incorporated herein by reference.

BACKGROUND OF THE INVENTION

1. Technical Field

The present invention relates generally to rotational forces and more specifically relates to creating a linear movement from a system of rotational forces.

2. Background Art

Propulsion of an object not in contact with a relatively fixed body, for example the ground or a planet surface, is generally obtained only by movement of air or other gases in a direction substantially opposite to the desired direction of movement for the object under the effect of the propulsion systems. In the absence of a suitable atmosphere, for example in space, propulsion is generally obtained by rocket systems or by other similar systems which involve the projection of particles at high velocity from the object, in the opposite direction of the object's intended travel. Such systems, by their very nature and design, require the consumption of significant quantities of fuel since the fuel or the byproducts of the consumption or expulsion of the fuel forms the particles to be projected.

Attempts have been made for many years to develop a propulsion system, which generates linear movement from a rotational drive. Examples of this type of arrangement are shown in a book entitled "The Death of Rocketry" published in 1980 by Joel Dickenson and Robert Cook.

However none of these previous arrangements has in any way proved satisfactory and if any propulsive effect has been obtained this has been limited to simple models. One of the problems with the previous attempts is the limited understanding of the true nature of the laws of motion and the nature of the physical universe. The laws of motion, as currently defined and used in the scientific community, are only accurate to a limited degree of precision. Many conditions and qualifications are required to apply them to the physical world, as it actually exists. This is far truer for the quantification of angular motion than it is for more linear motion. The laws of motion postulated by Newton are built upon his first law of inertia and are generally regarded as the foundation of Einstein's theory of relativity.

In the cosmos, everything is moving and there is no object that is perfectly static and motionless. The very first law of physics involves concepts that are only proper in a given frame of reference. Consider a body "at rest." The idea of "at rest" implies a lack of motion. However, the object is only "at rest" with respect to the relative motion of the object's immediate environment. Matter "at rest" is actually moving in patterns of motion that create the appearance of static motionlessness, yet the accumulated energies within the matter, in addition to the relative motion of the composite cosmic environment, is well known and provides sufficient evidence that everything is in a state of constant motion. Inertia, as it is generally referred to in relation to the laws of physics, represents relatively balanced force relationships creating relatively constant and stable motion patterns.

The basic formulas typically used to describe various angular forces are sufficient to explain only the most basic concepts relative to the behavior of spinning masses. They are the accepted formulas of Newtonian physics for linear motion applied to rotation with the linear components exchanged for angular ones. Rotational inertia is generally defined with the appropriate embellishments necessary to include the shape of the mass about the axis of rotation as an additional factor in the magnitude of the inertia.

Newton's first law of motion dealing with inertia and the inertial reference frames used in the calculation of linear forces do not, in the strictest sense, apply to rotational force associations. Inertial reference frames are usually linear by qualification and rotating frames of reference are never inertial. This fact is not a significant factor to include in the calculations of most linear forces. In most cases of ordinary motion, the angular components in the inertial reference frame are negligible. For example, air resistance is frequently a negligible factor in certain cases and, in those cases, can therefore be ignored. Or as the limitations of the linear velocity of things is ignored unless sufficiently close to the recognized maximum. Similarly, the non-linear components of most inertial reference frames ignored, and can be, for most ordinary kinds of motion. The additional factor of shape forever qualifies the angular motion aspects of particle associations with respect to the force of that association. This is the most meaningful and valuable factor separating the behavior of angular force from linear force.

Motion on a scale large enough with respect to the earth and the cosmic environment to be substantially non-linear can never be ignored. And this is not the case with most kinds of ordinary motion. In the fundamentals of physics, this fact is considered significant only for large-scale motions such as wind and ocean currents, yet "strictly speaking" the earth is not an inertial frame of reference because of its rotation. The earth's non-linear character is observed in the case of the Foucault pendulum, the Coriolis Effect, and also in the case of a falling object which does not fall "straight" down but veers a little, with the amount of deviation from its path dependant on the period of time that elapses during the fall. All events are subject to this fact to a greater or lesser extent.

The mathematical purpose of inertial reference frames is to isolate a motion event in order to identify force components. Acceleration will only be observed in systems that have a net force in a given direction and are not balanced or zero. Since this is only valid for the linear components of motion, it works well for all kinds of motion phenomena that are primarily linear in nature; the associated angular component being either idealized or considered negligible. Only the linear force aspects of any of these measurements hold precisely true to the formulas of mathematics describing them. To the degree that angular components of motion are associated with the reference frame used for measuring and calculating force relationships, and to the extent which these angular components are not included in the formulas for calculation, is to the degree these formulas are in error. The fact that angular reference frames cannot and do not represent inertial reference frames indicates that the effect of angular force is not so easily isolated in order to identify component effects.

Mathematical analysis of rotational forces reveals that the formulas describing rotational motion are also limited in additional respects. Motions that include anything more than ninety degrees of rotation cannot be used as true vectors. The fundamental technique of vectors, used to determine the composite result of the effect of multiple forces, will not work for rotational motion due to the inherent lack of integrity in the model. Individual angular displacements, unless they are small, can't be treated as vectors, though magnitude and direction of rotational velocity at a particular point in time and space can be given, which is necessary. But this alone is not sufficient, because the rules of vector mathematics do not hold with regard to the order of the addition of these forces.

If the displacement of an object is given by a series of rotational motions, the resulting angular position of the object is different depending on the order of the sequence of angular motions. Vector mathematics requires that addition be commutative (a+b+c=c+b+a). To calculate the motion of the precessional adjustments which multiple disturbing torques have on a spinning mass in a dynamic environment requires extremely complex mathematical calculations and is not accounted for in the previous attempts to translate rotational energy into linear movement.

The fact that these precessional adjustments can be affected by a strong magnetic field, and that there are no mathematical formulas that include this phenomenon as a factor of calculation, demonstrates that angular momentum is not fully predictable by the current formulas of mathematics and this is why there has been no true success in developing an apparatus which can efficiently and effectively use the angular momentum of a spinning mass to create a controlled linear movement.

The simple systems of motion that involve a magnitude of angular momentum that is relatively large with respect to the mass of the rotating body all exhibit nuances or nutation of precessional adjustment not described by the force components given by the accepted formulas of physics for angular motion. The Levitron is one excellent example, and there are additional examples that reveal how the rotating systems of motion in the natural environment are significantly more complicated than is typically described by the formulas associated with these patterns.

When these motions are recreated, using the accepted formulas for these patterns, the motion is not at all like the naturally observed versions and is sterile and fixed, lacking the nuances and nutation that exist in the cosmic environment. The nuances and nutation of spinning motions observed in nature are typically complex composite angular effects of the local cosmic environment, down to and including the immediate angular motions of observation. This is why a typical gyroscope tends to dispose its axis parallel to the earth's in an effort to achieve overall dynamic equilibrium within the total environment. All angular motion is affected by all other angular motions, at least to some degree and a close examination reveals that everything moving is affected to a certain extent. However, rotating systems of force generate a motion pattern that can be used to magnify this interactive effect and, therefore, reveal the influence of the cosmic environment on these patterns of revolving motion.

When the cosmic influences are analyzed, any and all of the motions of anything and everything include some factor of angular displacement. A perfectly straight line is only a concept with respect to a mathematical idea. In reality, nothing moves in absolutely linear displacements, to one degree or another, there is typically an angular component to all motions. Even the primarily linear trajectories associated with electromagnetic radiation are slightly curved and this phenomenon can be readily observed in the vast stretches of outer space. In many cases, the angular component of motion is negligible for all practical intents and purposes, in other cases, it is the primary force of action, but in no case is it non-existent.

Gravity is the reason: the closer an object is to a strong gravitational force, the greater the amount of angular displacement in the surrounding motions. Astrophysicists account for this influence on the light of far away galaxies and describe the effect as a gravitational lens. Gravity exerts a torque on all matter within its grasp and should be included in relativity's equivalence principle to further qualify otherwise pure linear acceleration. The angular paths of moving bodies create the inevitability of a cosmic torque in the spatial frame of any gravitational mass.

The Coriolis Effect is a composite result of the force of gravity in association with the rotating circular path of any given rotating system. As it is ordinarily viewed, the effect on large-scale motions on the surface of any revolving sphere is with respect to linear latitude until reaching a minimum at the poles. A critical examination will show that the angular component of motion is the same everywhere on the planet. Only the angle, with respect to the direction of the force of gravity, changes from the equator to the poles. At the equator, the radius, with respect to the axis of rotation, is greatest; this maximizes the effect on linear motions and is used to advantage when launching rockets into orbit around a sphere.

This bending of motion associated with gravity is the fundamental requirement to achieve a universe that behaves as if having purely linear forces on all but the largest scale of cosmic proportions. All straight lines of motion are ultimately elliptical curves. Accordingly, without an improved understanding of the forces associated with spinning masses and the influence of the gravitational field that is associated with movement of objects in general, it will be impossible to create devices that maximize the use of spinning masses and rotational energy to create linear motion. This means that any device which attempts to harness the kinetic energy and possible advantages based on these principles will continue to be sub-optimal

SUMMARY OF THE INVENTION

Three ring masses, functioning as concentric ring gyro motors, are angled at ninety degrees with respect to one another and are arranged in an orthogonal association inside a housing that includes a central hub with eight (8) spokes attached to two hemispheres shells with apportioned holes for the spokes and electro coils used for steering. The mass distribution for the rings is such that the rotating ring masses are maximized and the containing mass is minimized. There is minimum friction for the primary rotation of the spinning ring rotors with all other angular forces translated across the containment structures uniformly. These spinning masses remain equal, unless the influence of precisely controlled and oriented destabilizing electro coils are used to disrupt the stability of one or more rotors by placing a controllable and varying magnetic field, from weak to strong, parallel to the axis of the spinning rotors.

BRIEF DESCRIPTION OF THE DRAWINGS

The preferred embodiments of the present invention will hereinafter be described in conjunction with the appended drawings, wherein like designations denote like elements, and.

DETAILED DESCRIPTION OF THE INVENTION

Figure 1:
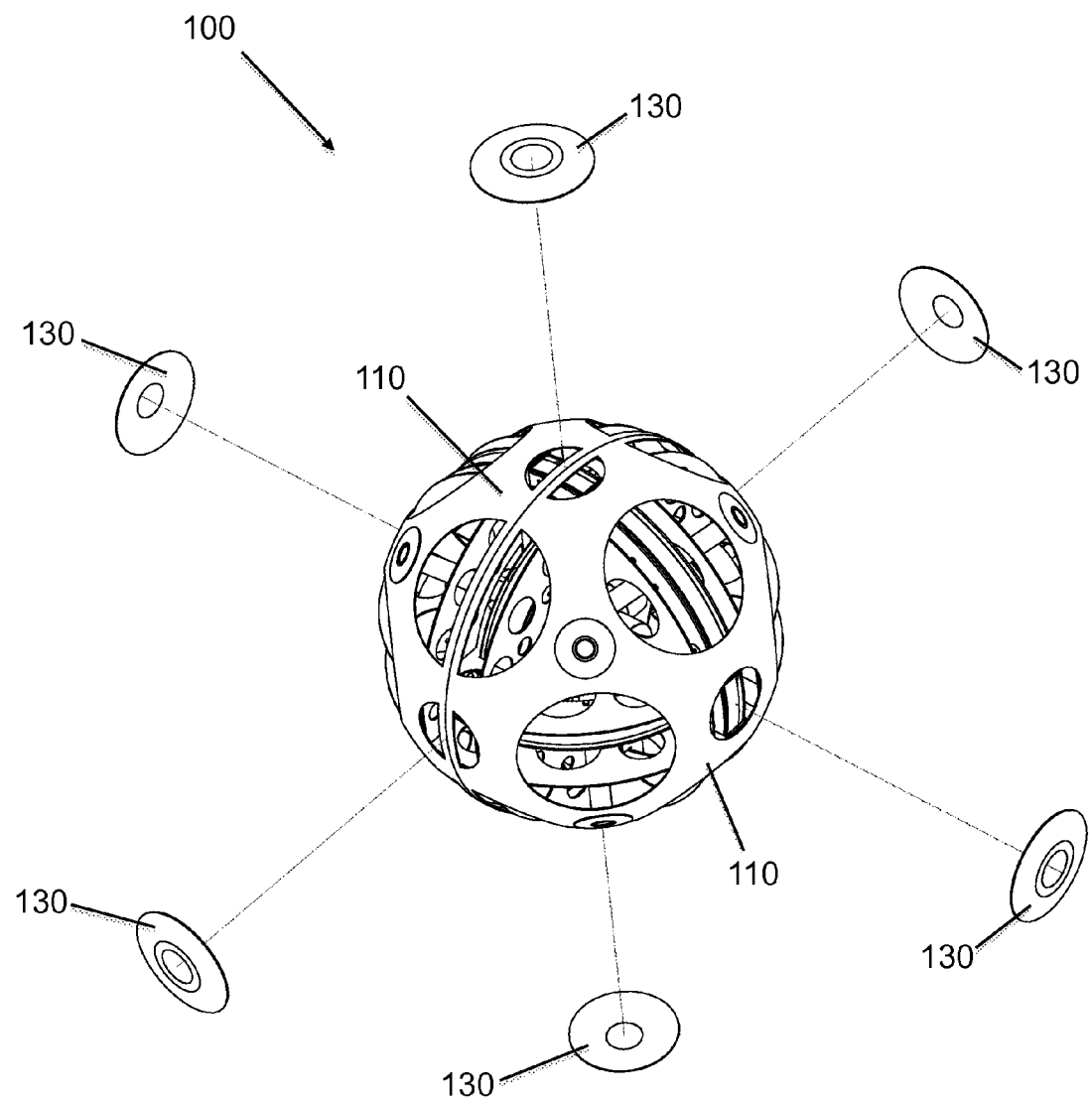
FIG. 1 is an exploded perspective view of the outer flat electro coils positioned for attachment to a containment sphere for use in conjunction with a gyroscopic propulsion apparatus in accordance with a preferred embodiment of the present invention.

The present invention is a combination of three interconnected gyroscopic ring-like rotating masses, with each of the three ring-like masses being configured to rotate in various planes, depending on the desired orientation. The most preferred embodiments of the present invention uses rotational movement of the ring-like masses to achieve gyroscopic propulsion, with the rotational movement of the rings being powered by an induction motor design. Regardless of the orientation of the three rings, for most operational situations, each of the three interconnected rotating masses will share substantially the same center of gravity and generate a separate yet equal and interactive kinetic energy and angular momentum in each of the three planes (e.g., x, y, and z), thereby providing internal stability and resistance to the influence of rotational forces from external sources such as gravitational forces.

The functionality of the apparatus described herein is further enhanced to have navigation capability by the additional feature of steering electro coils. These coils can be turned on to generate varying amplitudes of magnetic field influencing the performance of the primary ring gyro rotors. These magnetic fields can be switched on and off in pulsating patterns as well as switched in their respective direction of magnetic polarity. The arrangement of the electro coils is such that each of the respective axes of rotation of the component ring gyro motors comprising the apparatus has a set of inner and outer coils able to generate a magnetic field surrounding the spinning rotor of the ring motor in such a manner as to destabilize it gyroscopically without magnetically affecting it otherwise. All of the materials of the spinning masses are not magnetically attracted to the steering field destabilization influence.

Permanent magnets on the spinning ring rotors would be adversely affected by the steering coils' magnetic influence, thereby slowing the speed of the rotors substantially. The ring gyro motors of the present invention are more preferably induction type brushless motors. Instead of having permanent magnets on the rotors being propelled by drive coils, copper plugs embedded in the ring rotors are activated using a pulsed sequence from four sets of three drive coils in each quadrant of the ring geometry, thereby inducing an eddy current magnetic field driving the copper plugs. The field effect on the copper plugs by the steering coils is uniform across the entire apparatus and therefore doesn't retard the spin of the rotors, but does effectively destabilize the gyroscopic force of the spinning rotors.

The various combinations of the electrically induced magnetic fields requires a sophisticated electronic control circuit for performance feedback used to manage a sensing circuit identifying the location of the copper plugs and the velocity of the spinning rotors, a drive circuit to accelerate rotation of the rotors, and a steering circuit to produce the destabilizing navigational capability of the apparatus by selectively energizing and de-energizing one or more of the steering coils. Cooling of these various circuits is maintained by the movement of cool air across them, which is also used for suspension providing substantially reduced rotational friction as well.

The apparatus of the present invention is fundamentally an engine that includes three independent and separate rotatable gyroscopic ring rotors, where each of the three gyroscopic ring rotors lies in a separate and distinct plane. In at least one preferred embodiment of the present invention, where each of the three planes (e.g., x, y, and Z) is perpendicular to the other two planes. Each of the gyroscopic ring rotors is capable of achieving substantially the same angular momentum at substantially the same angular velocity. By simultaneously spinning each of the three gyroscopic ring rotors, the composite superstructure comprised of the three individual ring rotors resists rotation in any single direction. This is known as "equal force presence."

Further, when the rate of rotation for the three spinning ring rotors reaches the appropriate level, the composite structure of the associated rings resists any change in orientation from any external force, including the gravitational field of the earth or other bodies large enough to generate a significant gravitational field. Accordingly, as the earth spins about its axis, the mechanism moves in the only direction possible, which is up, or away from the center of mass for the body exerting the gravitational force. By adjusting the angular momentum of each of the rings relative to the other rings, or by disrupting the rotation of one or more of the spinning right, altitudinal and directional changes of the apparatus can be achieved. For purposes of this disclosure, each of the gyroscopic ring rotors may be called a "gyro actuator."

The stabilizing force exerted by each gyro actuator is positioned against the forces exerted by the associated gyro actuators, so that a motion feedback loop is created. This composite superstructure of angular momentum will exhibit a resistance to any force of torque from any direction, making for what can be called "super-additive rotational inertia." The rotational inertia of this composite superstructure is related to the angular momentums of the individual gyro actuators. As long as the forces of the individual rotors are correctly matched and balanced against one another, an internal force of stabilization or equal force presence can be achieved. With a high enough level of angular momentum, this internal force will exceed any influence of external force in the surrounding environment; including the rotational torque associated with the force of gravity in a given gravitational field. Obviously, the greater the gravitational field, the greater the kinetic energy and angular momentum that will be required to overcome the gravitational forces associated with a given environment.

Since it is desirable to maximize angular momentum with respect to mass, the housing containing the ring rotors is constructed to be as lightweight as possible. The angular acceleration of the rings does not need to be more than the necessary amount to increase angular velocity and momentum and, eventually, reach the desired level. This rate of increase can be gradual, and time can be given for this force to accumulate as the rate of rotation for the rings is increased.

The energy put into the system is converted into the kinetic energy of rotation, minus any loss of energy as heat due to frictional resistance. The amount of energy that can be stored within the system without large losses due to the frictional resistance of rotation and precessional motion depends at least in part on the perfection of the gyro design and construction. If sufficiently perfect, the generation of tremendous amounts of kinetic energy can be accumulated in the form of angular momentum. The degree of the precision of the perfection of this component, thereby minimizing frictional resistance, is a factor in determining its efficiency and effectiveness as a gyro actuator.

If the angular momentum is sufficient, and the containment and suspension system is sufficiently lightweight and free to move, only being anchored at one point to prevent the backspin of this containment ring, each rotor ring will carry the containment ring with it, duplicating any of its secondary angular displacement. And, like a heavy pendulum or a gyro compass, it will maintain its cosmic orientation in space adjusting to a point of maximum stability until harmony with the spinning earth and the cosmic environment is achieved. The final orientation of a free and unrestrained spinning ring gyro is with its axis of rotation approximately parallel to the earth's axis except that it will be spinning in the opposite or complementary direction.

The velocity of rotation and the rotational inertia are the factors that determine the magnitude of the force of the angular momentum of the ring rotor and can be calculated, after accounting for factors such as friction and the inertia of the containment ring as retarding factors of generated force, which will negatively impact the overall performance of the system.

The spin of a ring with minimum frictional resistance to rotation, once stabilized with respect to gravity, if free to move in any direction, will, at a rate proportional to its ratio of angular momentum with respect to mass, continue to adjust with respect to the environment until the point of maximum stabilization is reached on a continuing basis. This position of maximum stabilization is oriented so that the axis of the spinning gyro is balanced between the retarding forces of gravity and the effort to align with the axis of the spinning earth, spinning in the same direction as the earth, thereby minimizing the overall amount of rotational motion manifested. Thus, the action of a ring gyro actuator with sufficient magnitude of angular momentum will exhibit a predilection to orient itself into a definitive position with respect to the cosmic environment in order to attain optimum stabilization with a substantial force.

With the existence of these individual gyroscope actuators, the primary component exists from which a gyroscope superstructure can be built. In one preferred embodiment of the present invention, each of the three rings is contained within a ring housing and fixed in position within a support superstructure, at ninety degree angles relative to one another, and are locked into place with respect to each other by the support structure, with the forces of action on the rings being distributed around the periphery of the superstructure in substantially equal and symmetrical manner with respect to the effects of the associated revolving forces of the rings.

This superstructure may then be placed in a final light, hollow, and thin, yet strong container or housing. This composite structure will resist torque from any and all directions equally, so long as the individual forces of each component mass are equal and balanced with respect to one another. The increase in the force of angular momentum of each individual component increases the resistance of the superstructure to any outside torque, including the overall frame of gravitational forces associated with the earth and other masses. The composite superstructure of actuators exhibits the super-additive force of maximum rotational inertia.

Knowing that the composite superstructure will resist torque from any direction is only one consideration of the result of this composite motion. The pairs of gyroscopes, placed in an orientation such that each pair is offset by ninety degrees to one another in a composite superstructure, cannot all be simultaneously in maximum equilibrium with respect to any cosmic environment that is held by the force of gravity, in an angular revolution, as is the case on the surface of a planet like the earth. When in such an environment, each of the three pairs of gyros will continue to exert their individual influences of action toward maximum stabilization, but all the while the composite superstructure will not be able to absorb any precessional adjustments.

Any pair of gyro actuators, by precessing to adjust to the force of torque will, of necessity, cause the other two pairs of gyro actuators to require this same adjustment, doubling the problem within the composite system, thus creating a motion feedback loop that has no resolution within the system. Only by being insulated by sufficient distance from the influence of gravity in the cosmic environment will the composite superstructure of interlocked gyroscopes find equilibrium. The superior resistance to torque will direct this system of motion to the environment, which is the freest from torque exerted by the gravitational forces inherent in a typical gravitational field. The degree of the magnitude of this composite force of resistance to torque is mechanically connected to, and dependent on, the individual force of each component gyroscope. Gravity is overcome when enough energy is generated by the system that the resistance to torque reaches a threshold resulting in a force of displacement in the direction where least external force, manifesting as torque, exists. This direction is generally away from any and all gravitational sources, including planets and other bodies of mass located within the universe.

The mass, shape, and speed of rotation are factors in the measurement of angular momentum, but shape and mass are the most significant factors in determining rotational inertia. This is true except in the special circumstance when the mass is spinning and angular momentum itself resists any secondary force of torque or tumble against the primary angle of rotation. Any secondary tumbling force is distributed about the periphery of the spinning object as precessional motion that will slow the primary velocity of rotation until a final balance of a single axis of rotation is achieved. The super-additive effect of increased rotational inertia of the mass in every direction except the one of primary rotation underscores the fact that an object rotating resists tumbling; there can be only one axis of rotation.

The equal force presence of the gyroscopically stabilized rotors produce an increased overall rotational inertia of the performing apparatus, and because of this, it thereby resists any influence from any outside torque on the composite mass of the apparatus. This resistance produces an ability for the overall mass to propel itself away from the source of torque in a trajectory path of least resistance, which is obtained depending on the magnitude of force generated by the masses of the spinning ring motor rotors. The navigational control of this path is manipulated by virtually instantaneously affecting the resistance angles of these driving rotors by liberating the cause of this resistance on a given rotor using the magnetically induced effect of destabilization generated by the steering coils. Because the influence of these destabilizing magnetic fields can be activated electronically on one, two, or three of the rotors simultaneously or in multiple combinations of pulsed sequential patterns, virtually any trajectory desired can be effected and obtained only being limited by the magnitude of space force potentials being generated.

The following assemblies and parts are used in the most preferred embodiments of the apparatus but those skilled in the art will recognize that the specific details provided for this embodiment are illustrative only and many variations and adaptations may be made for specific applications.

Containment Sphere Housing Assembly.

The containment sphere housing assembly most preferably comprises two hemisphere shells with apportioned holes for the six flat steering coils and the eight connecting spokes attached to the single central hub with six cylindrical steering electro coils.

In the most preferred embodiments of the present invention, each of the hemisphere shells that comprise the containment sphere housing is manufactured from a very strong and rigid, yet relatively lightweight engineering plastic. Each of the hemisphere shells will comprise a plurality of apertures for supporting and positioning a plurality of spokes that are affixed to a central hub. Each hemisphere shells may also comprise additional apertures to reduce the overall mass and weight of the containment sphere housing while also allowing for air flow and the cooling of the ring motors contained within the housing. There is one hole at the axial location of the hemisphere and four semi-circular holes at the equatorial edge for the placement of the outer flat steering coils. These semi-circular holes become circular when two hemispheres are placed together fully containing the two placement pedestal assemblies holding the ring motors and are locked together by the spokes which are mounted to the central hub. The two hemispheres locked together form the final containment sphere.

Support Spokes.

The support spokes are hollow tubes made out of very strong and rigid, yet lightweight engineering plastic that are used to lock the containment hemispheres to the central hub. There are eight support spokes mounted to the central hub.

Central Hub.

The central hub has eight support spokes mounted to it and six inner steering coils mounted to it. The central hub is oriented so that 2 of the six inner steering coils are aligned to the axis of each of the three contained ring gyro motors. The support spokes are evenly placed between these steering coils to fit through the ring motor emplacements within the two pedestal assemblies and serve as attachment points for assembly of the apparatus for gyroscopic propulsion.

Inner Steering Coils.

There are a total of six substantially cylindrical electro steering coils placed along the axis of each of the orthogonally placed ring gyro motors mounted to the central hub. These coils are each made of a soft iron core wound with laminated copper wire and, when pulsed with electricity, generate a magnetic field which is used to destabilize the gyroscopic stability of one, two, or all three ring gyro motors. These inner steering coils are used in coordination with the outer flat steering coils mounted to the containment sphere.

Outer Flat Steering Coils.

There are a total of six substantially flat, yet sufficiently concave electro drive coils placed along the axis of each of the orthogonally placed ring gyro motors mounted to the containment sphere. These steering coils are each made of a soft iron core wound with laminated copper wire and, when pulsed with electricity generating a magnetic field, are configured to destabilize the gyroscopic stability of one, two, or all three ring gyro motors. These outer steering coils are used in coordination with the inner steering coils mounted on the central hub.

Ring Motor Placement Pedestal Assembly.

The pedestal assemblies are designed to hold the three powerful ring gyro motors in an orthogonal association and insuring all secondary angular forces are translated across the apparatus sphere uniformly. These pedestals are assembled from flat pieces arranged to fit to the ring motor assemblies from flat parts of very rigid and strong, yet lightweight material. The pedestal pieces come together to form pedestal hemispheres in which the ring gyro motors are placed. When both platter hemispheres are placed together, the ring gyro motors are encased in the pedestals and locked in an orthogonal association. The two pedestal hemispheres are placed in the containment hemispheres at ninety degree angles, thereby locking the pedestals together around the supported ring gyro motors.

Pedestal Hemisphere Assemblies—Flat Pedestal (X Axis)—Flat Pedestal (Y Axis)—Flat Pedestal (Z Axis).

The pedestal hemisphere assemblies comprise three unique sets of four identical flat pieces that are parallel to the each of the three axes respecting the orthogonal association of the ring gyro motors, the X axis, the Y axis, and the Z axis.

These flat pedestal pieces are cut to fit to the containment sphere on their respective outer radius and are cut to fit the ring gyro motors on their respective inner radius. Each flat pedestal piece is made out of very strong and rigid, yet lightweight engineering plastic that is half of a full cutout platter pedestal. Two platters and four pedestal pieces, come together around each ring gyro motor and are inserted into one another through cut out slots in the dimension of the other flat pedestal pieces which are matched for each pedestal piece. Each ring gyro motor has two pedestal platters parallel to the motor, one on either side, comprised of four pedestal pieces. And each ring gyro motor has four pedestal platters and eight pedestal pieces supporting the ring gyro motor at each quadrant of the respective motor.

Ring Motor Assemblies.

Three concentric ring motors are each designed to generate substantially identical respective angular forces and are arranged in an orthogonal association with one another. In the most preferred embodiments of the present invention, each ring motor comprises a ring rotor positioned between two faceplates and an inner radial band where the ring rotor is suspended by four sets of air bearings and where the ring rotor is mobilized using electrical induction technology.

Ring Rotors.

The concentric three ring rotors provide the rotational force for the gyroscopic apparatus. The ring geometries and rotational movement of the ring rotors provides for the generation of rotational angular forces from each of the three ring rotors that are designed to be substantially equal. The ring rotors are most preferably manufactured from a heavy non-magnetic metal suitable for maximizing gyroscopic performance. Each of the three ring rotors are sized to be a matched set in which their respective rotational inertia is identical to each of the other rotors, thereby ensuring that their respective angular momentum is substantially identical at substantially identical rotational velocities thereby producing substantially identical kinetic energies in each of the three ring motors.

Flat Air Bearings.

These are air bearings that can be purchased from a number of commercial sources and provide pressurized air supplied through tubing to flow through the aluminum housed carbon fitted to the surface forcing air to suspend the axial surfaces of each of the three ring motors' ring rotors. There are twenty-four flat bearings in total, with eight being used for each ring rotor, four on each side of the ring rotor's flat axial surface, and one air bearing at each quadrant.

Flat Bearing Adjustment Screws.

Each flat air bearing has a non-magnetic metallic adjustment screw controlling the precise axial distance of the bearing from the faceplate for precise control of the placement against the radial surface of the ring rotors. It has a ball fitting which is set into the backside of the air bearing and a threaded fit into the faceplate allowing for adjustment.

Faceplates.

There are six faceplates, two for each ring motor. The faceplates are positioned on either side of each ring rotor. The faceplates are made of very strong and rigid, yet lightweight aerospace grade engineering plastic that "sandwiches" the rotors between them in the axial dimension and have the flat air bearings placed between them and the rotors. Each ring motor has two of these faceplates bolted together through eight holes aligned with the four radial bearing mounts with two holes each at each quadrant of the faceplate and eight holes used to bolt them together through the ring motor inner containment band in each quadrant between the radial mounts.

Inner Radial Mounting Band.

The inner race of each ring motor is supported by an inner band of strong and rigid, yet lightweight aerospace grade engineering plastic used to house the drive coils and radial air bearings on the radial surface. It is also used to mount the faceplates together across the axial surface holding together the ring motors.

Radial Band Axial Mounting Bolts, Washers, and Nuts.

A plurality of non-magnetic metallic bolts, washers, and nuts used to hold the faceplates to the radial band and radial bearing mounts.

Radial Band Air Bearing Mount Radial Mounting Bolts, Washers, and Nuts.

A plurality of non-magnetic metallic bolts, washers, and nuts used to hold the radial air bearing mounts to the radial band.

Radial Air Bearings.

The radial air bearings are used to suspend the ring rotors in the housing and provide a custom convex bearing surface, specifically configured to match the radius of the inner surfaces of the three ring rotors for each of the ring gyro motors. These bearings use pressurized air supplied through tubing to flow through the aluminum housed carbon forcing air to suspend the inner radial surfaces of each of the three ring motors' ring rotors. There are twelve radial bearings in total, four on the inside radius of each of the three ring rotors.

Radial Air Bearing Mounts.

The radial air bearing mounts are manufactured from a very strong highly rigid, yet lightweight engineering plastic that is designed to hold the radial bearings in place in each of the ring motors. Each mount has a rectangular extruded cut that the radial bearing is placed into with a center hole for the bearing's adjustment screw which threads through this mounting thereby controlling the location of the convex bearing surface and, therefore, the radial pressure against the radial surface of each of the three ring motors' ring rotors. There is one mount for each radial air bearing, therefore a total of twelve, four for each ring motor, one at each quadrant. The inside surface of the mount is fitted to the inner radial band's outer surface. There are two radial mounting holes on the ends of each mount that are used to bolt them to the radial band housing. And there are also two a holes across the axial dimension just inside the radial holes used to bolt them to the ring gyro motors' faceplates.

Radial Bearing Adjustment Screws.

Each radial air bearing has a non-magnetic adjustment screw controlling the precise radial distance of the radial bearing. It has a ball fitting which is set into the backside of the air bearing and a threaded fit into the radial bearing mount allowing for adjustment. In this manner, the distance between each ring rotor and the other components can be controlled to ensure minimal friction and resistance to the rotation of the ring gyros.

Drive Coils.

Thirty six total cylindrical electro drive coils, (twelve per ring motor), using a series of three drive coils placed in each quadrant of each ring gyro motor, with the drive coils being positioned between the air bearings. Each of the drive coils are made from a soft iron core wound with laminated copper and, when pulsed with electricity generating a magnetic field, are used to induce a magnetic field into the plurality of copper plugs embedded in the inner radius for each ring rotor and precisely timed to pulse the field, thereby applying a magneto motive force for accelerating the ring rotors into high speed rotation.

Electric Drive and Steering Circuits.

The electrical power supply and controls for all of the coils can be fed to the apparatus for gyroscopic propulsion through an umbilical cord tethered to the apparatus and, in the most preferred embodiments of the present invention, will be miniaturized and contained in the central hub providing for portability.

Compressed Air Supply.

A compressed air is used to support the air bearing suspension of the ring rotors and can be fed to the apparatus through an umbilical cord tethered to the apparatus. In the most preferred embodiments of the present invention, the compressed air supply will be engineered into and generated from the high speed rotation of the rotating ring rotors providing liberation and complete self containment of all components ideal for distant destinations.

Referring now to FIG. 1, an exploded perspective view of an apparatus for gyroscopic propulsion 100 with outer steering coils 130 positioned for attachment to hemispheres 110 is depicted. Outer steering coils 130 are used to temporarily disrupt the magnetic field of the ring rotors contained within apparatus for gyroscopic propulsion 100.

Figure 2:
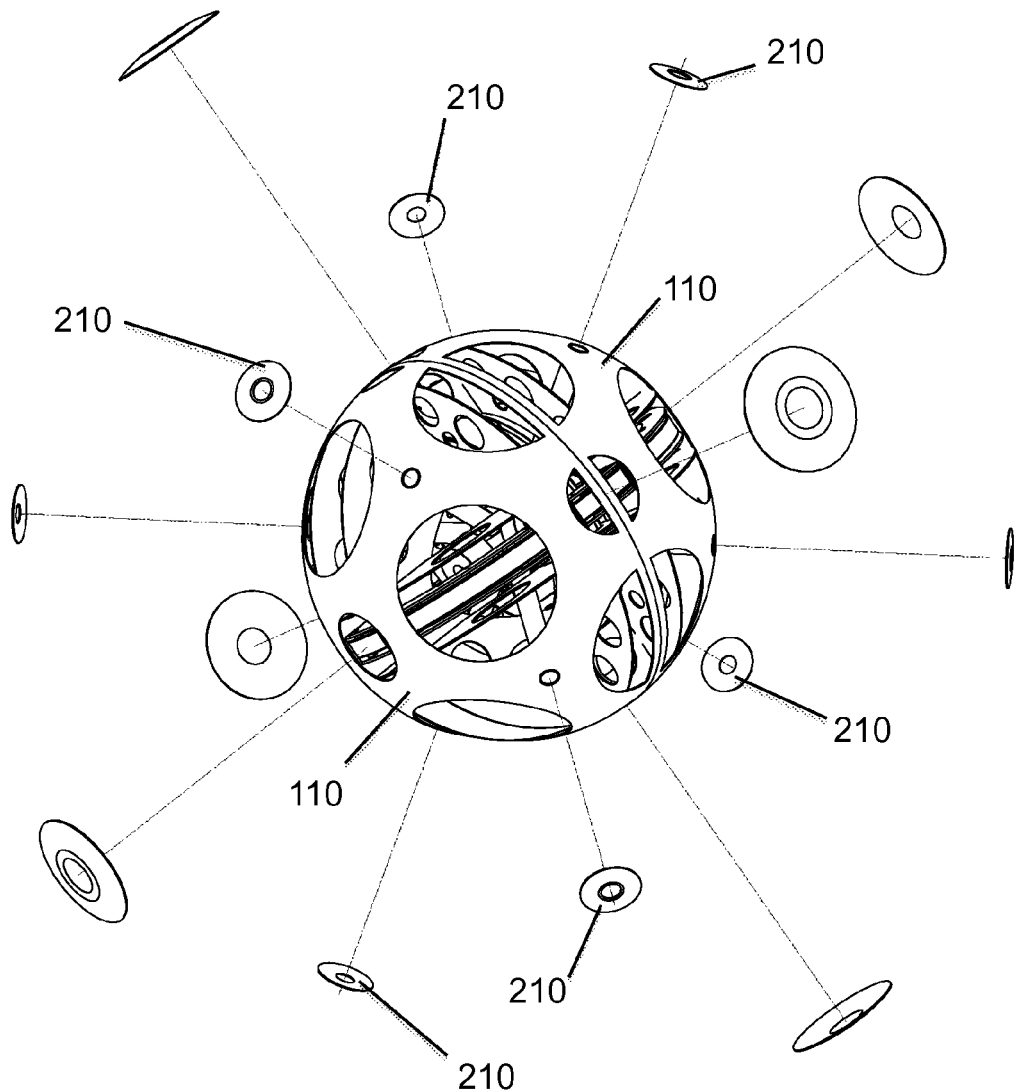
FIG. 2 is an exploded perspective view of the outer flat electro coils and the hub spoke locking nuts used in conjunction with a gyroscopic propulsion apparatus in accordance with a preferred embodiment of the present invention.

Referring now to FIG. 2, an exploded perspective view of the outer flat electro coils and the hub spoke locking nuts 210 used in conjunction with a gyroscopic propulsion apparatus in accordance with a preferred embodiment of the present invention is depicted.

Figure 3:
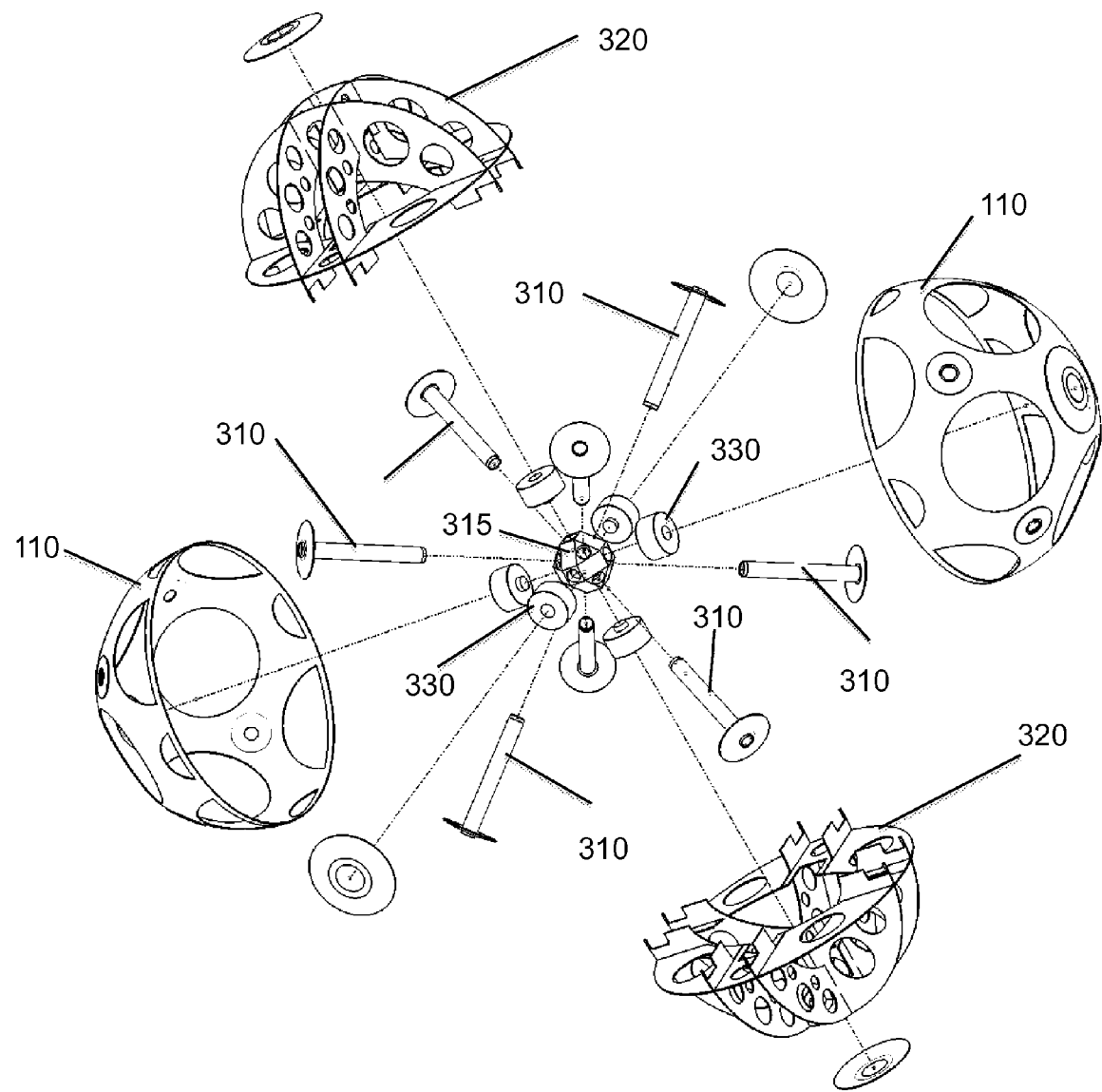
FIG. 3 is an exploded perspective view of the containment structure used in conjunction with a gyroscopic propulsion apparatus in accordance with a preferred embodiment of the present invention.

Referring now to FIG. 3, an exploded perspective view of the containment structure used in conjunction with a gyroscopic propulsion apparatus in accordance with a preferred embodiment of the present invention is depicted. As shown in FIG. 3, locking nuts 210 are used to connect hemispheres 110 with support spokes 310 and pedestal assemblies 320 providing support for hemispheres 110. Also shown are central hub 315 and inner steering coils 330.

Figure 4:
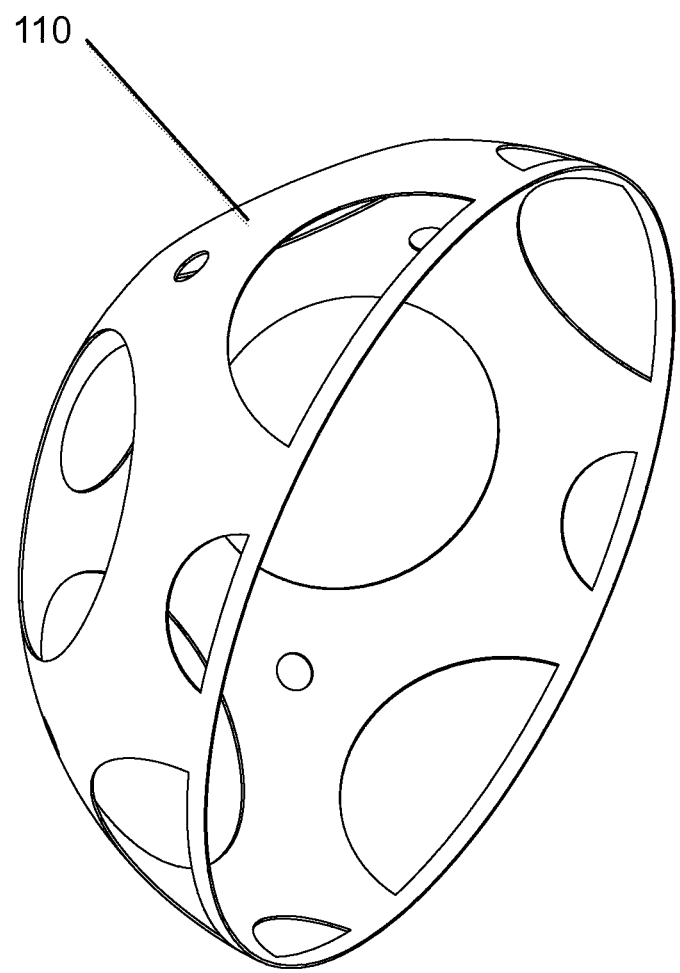
FIG. 4 is a perspective view of one of two hemispheres or half shells for a containment shell used in conjunction with a gyroscopic propulsion apparatus in accordance with a preferred embodiment of the present invention.

Referring now to FIG. 4, a perspective view of one of two hemispheres or half shells 110 for a containment shell used in conjunction with a gyroscopic propulsion apparatus in accordance with a preferred embodiment of the present invention is depicted. Two hemispheres 110 are joined together and used to contain the ring rotors that create the rotational forces used to propel the apparatus for gyroscopic propulsion 100 of FIG. 1.

Figure 5:
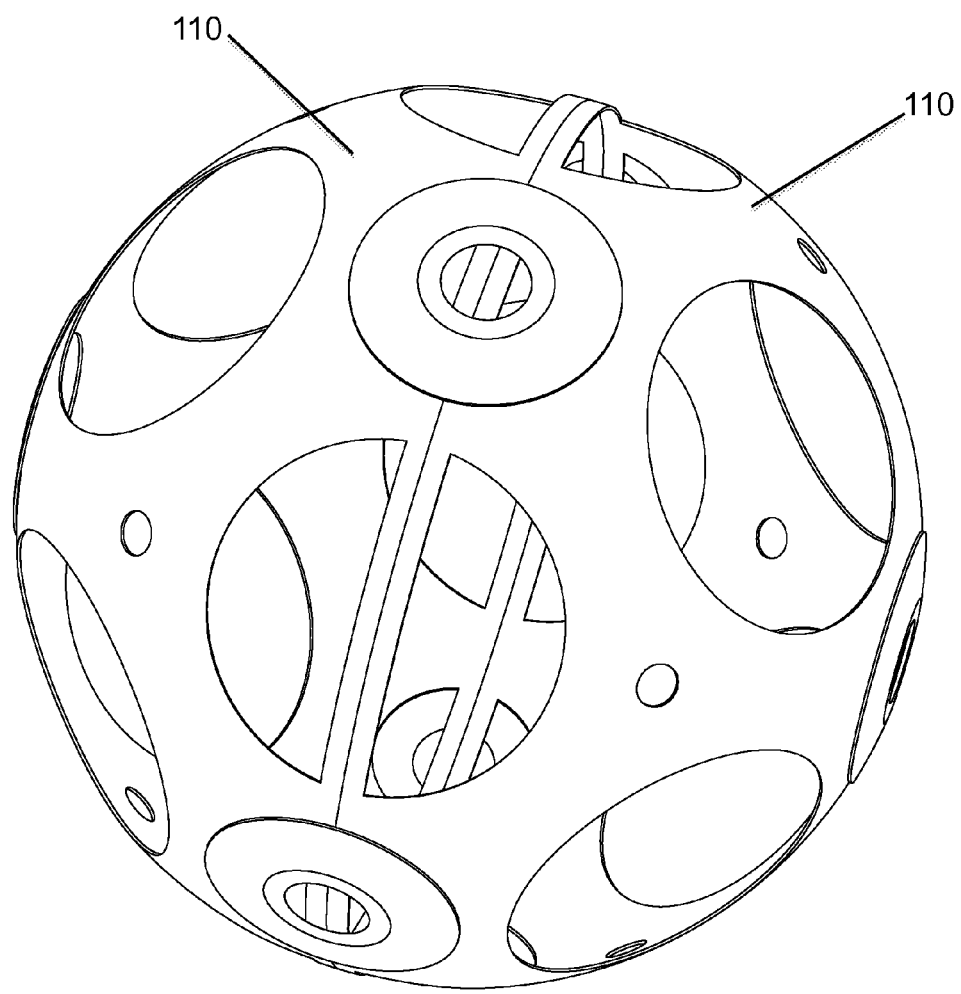
FIG. 5 is a perspective view of a containment shell comprising two hemispheres used in conjunction with a gyroscopic propulsion apparatus in accordance with a preferred embodiment of the present invention.

Referring now to FIG. 5, a perspective view of a containment shell comprising two hemispheres 110 used in conjunction with a gyroscopic propulsion apparatus in accordance with a preferred embodiment of the present invention is depicted.

Figure 6:
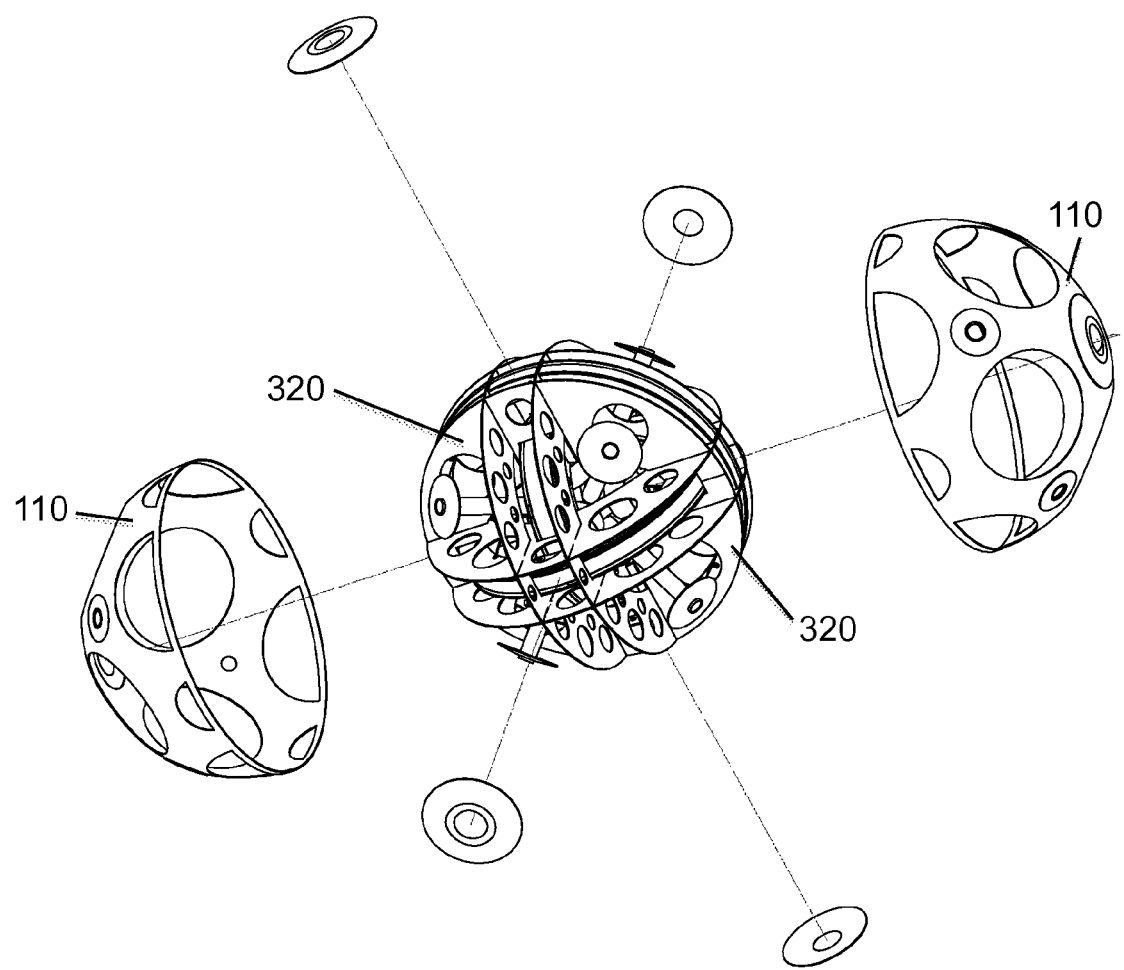
FIG. 6 is an exploded perspective view of the containment shell and associated components used to support the ring rotors for a gyroscopic propulsion apparatus in accordance with a preferred embodiment of the present invention.

Referring now to FIG. 6, an exploded perspective view of the containment shell and associated components used to support the ring rotors for a gyroscopic propulsion apparatus in accordance with a preferred embodiment of the present invention is depicted. As shown in FIG. 6, two hemispheres 110 are used to enclose two pedestal assemblies 320. Pedestal assemblies 320 and support spokes 310 are used to support the ring motors that create the rotational forces used to propel apparatus for gyroscopic propulsion 100 of FIG. 1. Also shown is a central hub 315 and inner steering coils 330.

Figure 7:
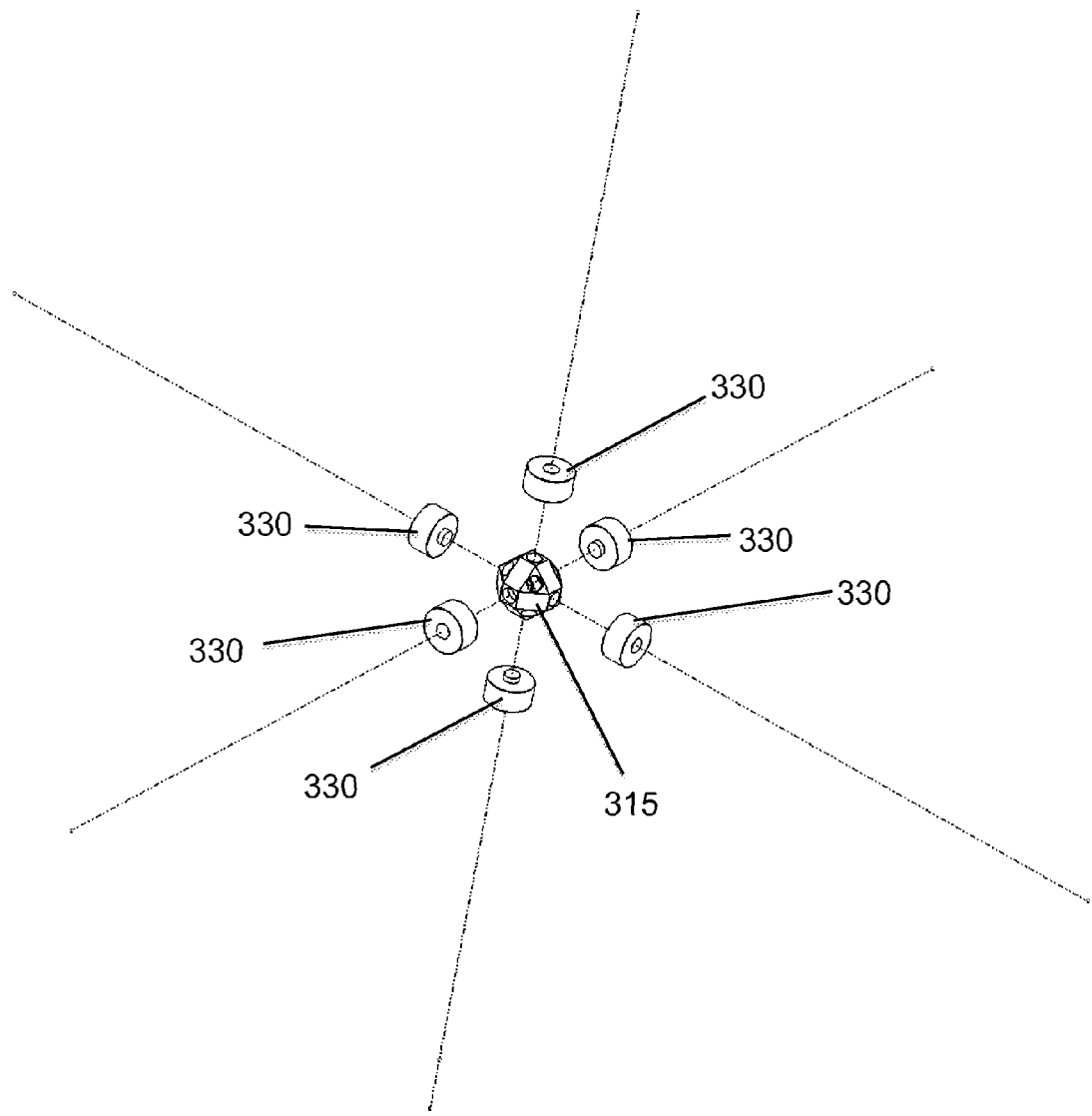
FIG. 7 is an exploded perspective view of a central hub with the inner steering coils used in conjunction with a gyroscopic propulsion apparatus in accordance with a preferred embodiment of the present invention.

Referring now to FIG. 7, an exploded perspective view of central hub 315 with a plurality of inner steering coils 330 used in conjunction with a gyroscopic propulsion apparatus in accordance with a preferred embodiment of the present invention is depicted. By placing a pair of inner steering coils 330 in alignment with each of the three axes, steering coils 330 can be used to momentarily disrupt the rotor stability associated with each of the three ring motors that create the rotational forces used to propel the apparatus for gyroscopic propulsion 100 of FIG. 1. This allows for additional control of apparatus for gyroscopic propulsion 100 of FIG. 1.

Figure 8:
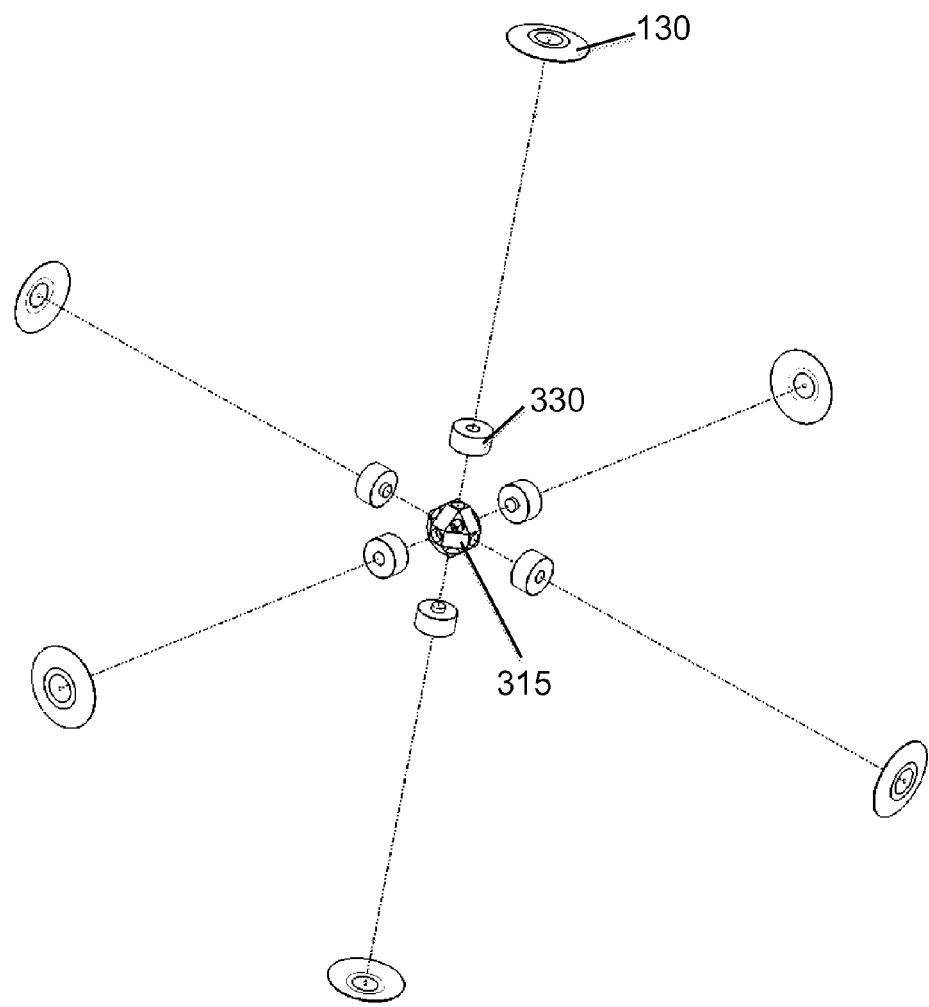
FIG. 8 is an exploded perspective view of a central hub, the inner steering coils, and the outer steering coils used in conjunction with a gyroscopic propulsion apparatus in accordance with a preferred embodiment of the present invention.

Referring now to FIG. 8, an exploded perspective view of central hub 315, inner steering coils 330, and outer steering coils 130 used in conjunction with gyroscopic propulsion apparatus 100 is depicted. A pair of inner steering coils 330 and a pair of outer steering coils 130 are each positioned in alignment with each of the three axes of rotation for the ring motors.

Figure 9:
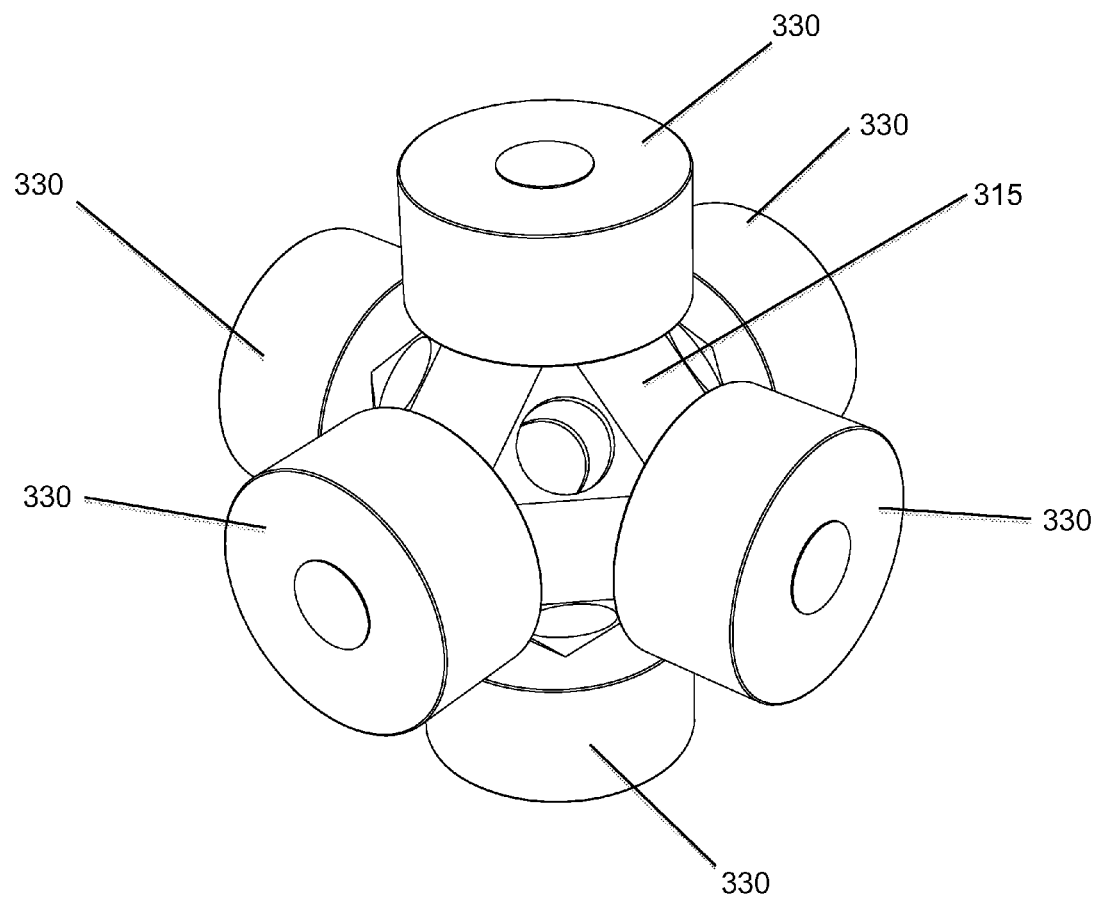
FIG. 9 is a perspective view of a central hub and the inner steering coils used in conjunction with a gyroscopic propulsion apparatus in accordance with a preferred embodiment of the present invention.

Referring now to FIG. 9, a perspective view of central hub 315 with inner steering coils 330 connected is depicted.

Figure 10:
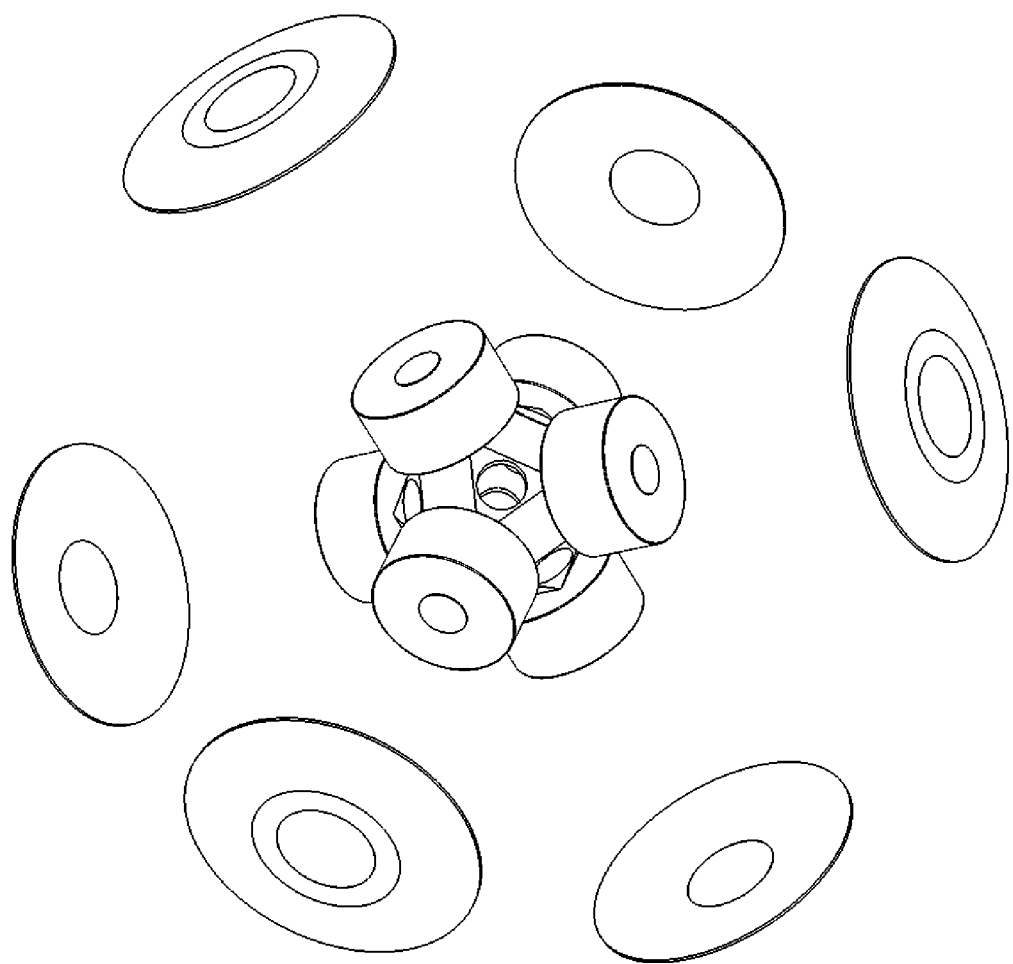
FIG. 10 is a perspective view of a central hub the inner steering coils and the outer steering coils positioned in alignment with the axes and relative positioning for placement in a containment shell used in conjunction with a gyroscopic propulsion apparatus in accordance with a preferred embodiment of the present invention.

Referring now to FIG. 10, a perspective view of central hub 315, inner steering coils 330 and outer steering coils 130 positioned in alignment with the axes and relative positioning for placement in a containment shell used in conjunction with a gyroscopic propulsion apparatus in accordance with a preferred embodiment of the present invention is depicted.

Figure 11:
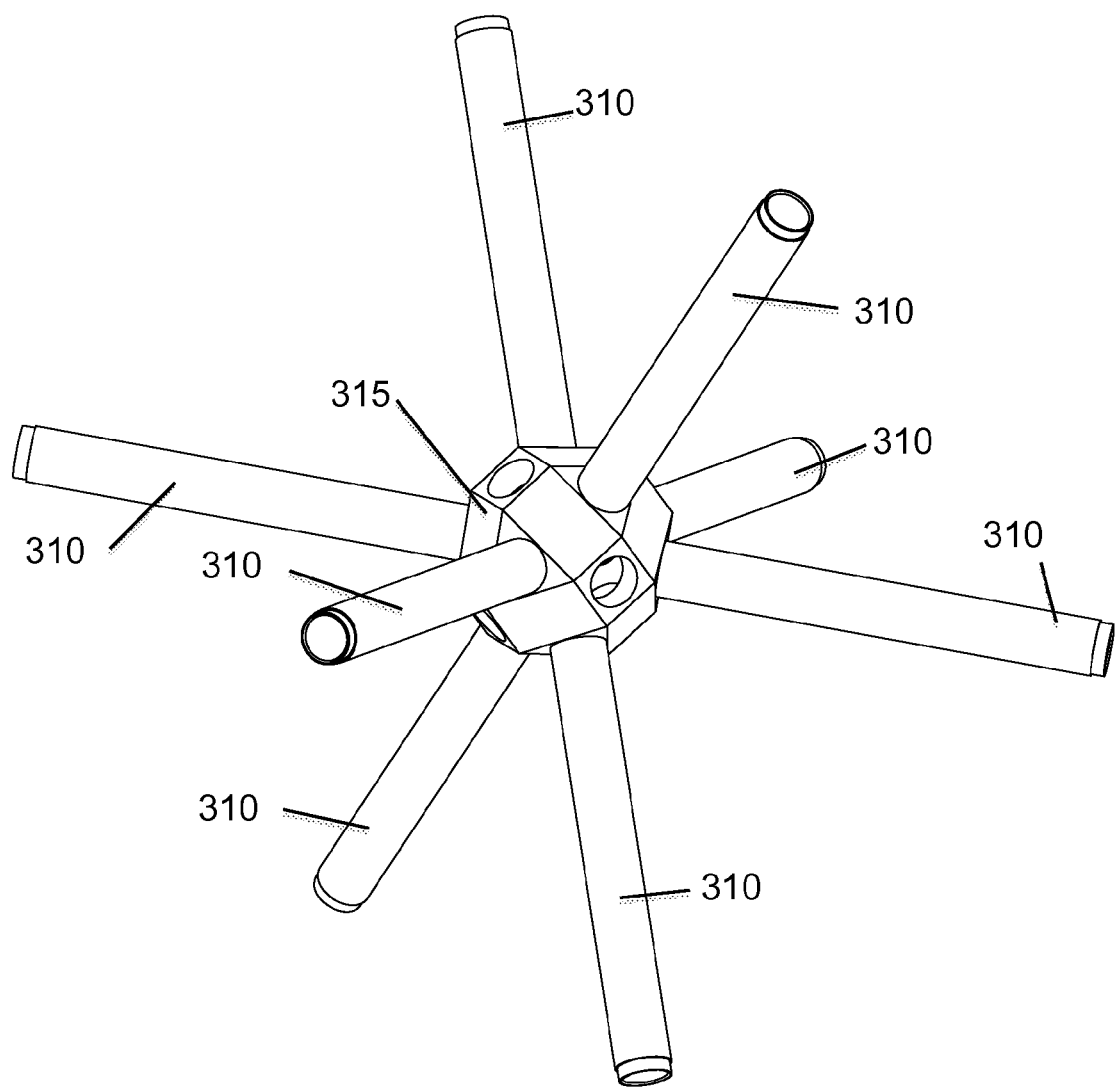
FIG. 11 is a perspective view of a central hub and the support spokes used in conjunction with a gyroscopic propulsion apparatus in accordance with a preferred embodiment of the present invention.

Referring now to FIG. 11, a perspective view of central hub 315 and support spokes 310 used in conjunction with a gyroscopic propulsion apparatus in accordance with a preferred embodiment of the present invention is depicted. As shown in FIG. 11, support spokes 310 are connected to central hub 315.

Figure 12:
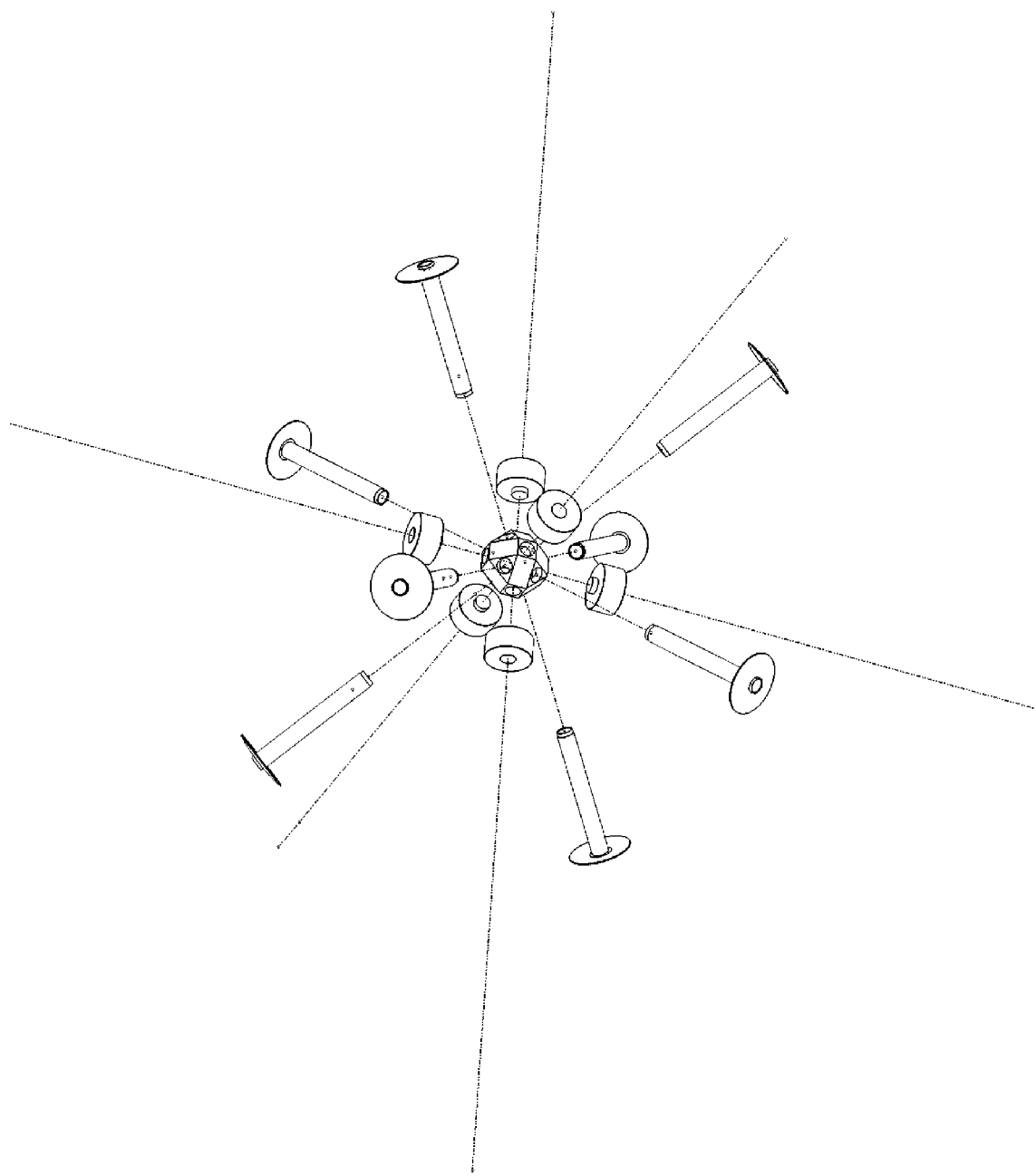
FIG. 12 is an exploded view of a central hub, the inner steering coils and the support spokes with hemisphere mounting fittings used in conjunction with a gyroscopic propulsion apparatus in accordance with a preferred embodiment of the present invention.

Referring now to FIG. 12, an exploded view of a central hub, the inner steering coils and the support spokes with hemisphere mounting fittings used in conjunction with a gyroscopic propulsion apparatus in accordance with a preferred embodiment of the present invention is depicted.

Figure 13:
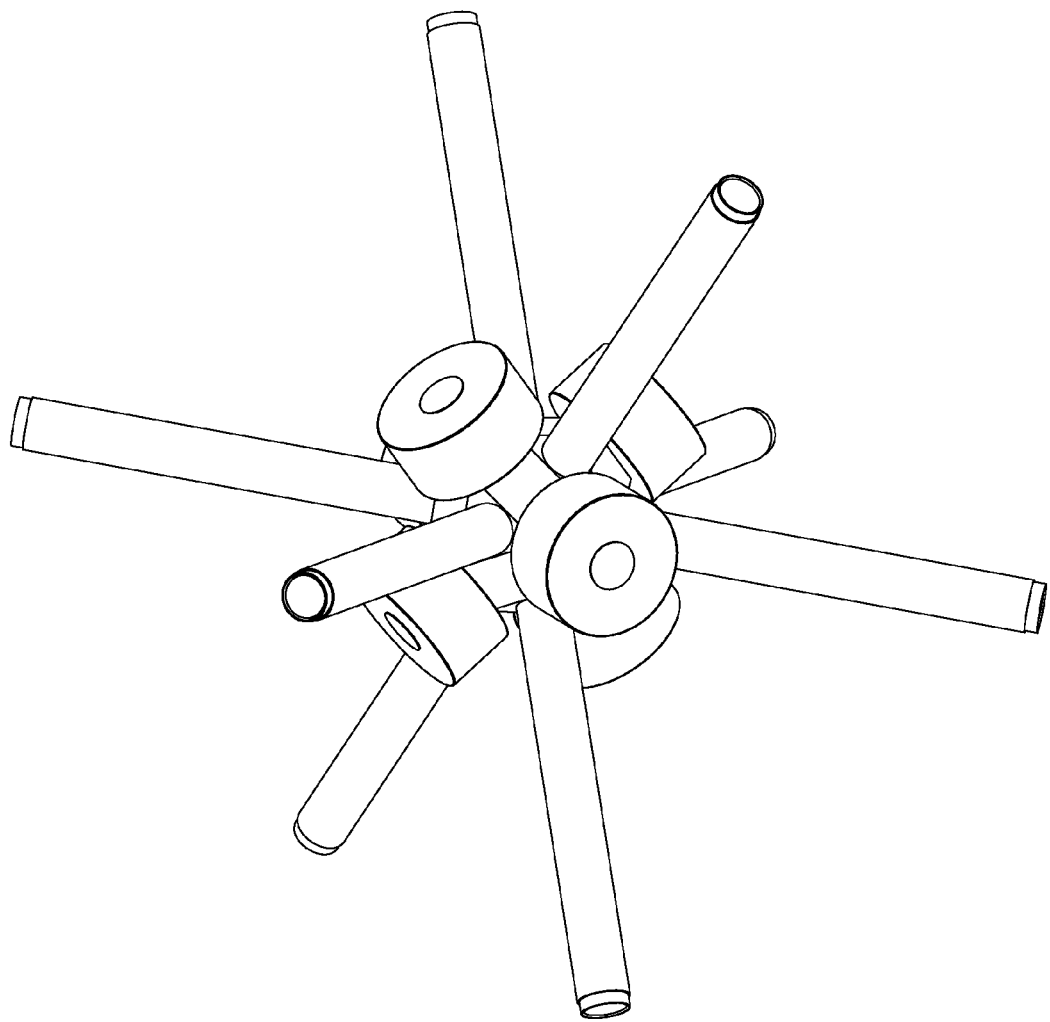
FIG. 13 is a perspective view of a central hub, the support spokes, and the inner steering coils used in conjunction with a gyroscopic propulsion apparatus in accordance with a preferred embodiment of the present invention.

Referring now to FIG. 13, a perspective view of a central hub, the support spokes, and the inner steering coils used in conjunction with a gyroscopic propulsion apparatus in accordance with a preferred embodiment of the present invention is depicted.

Figure 14:
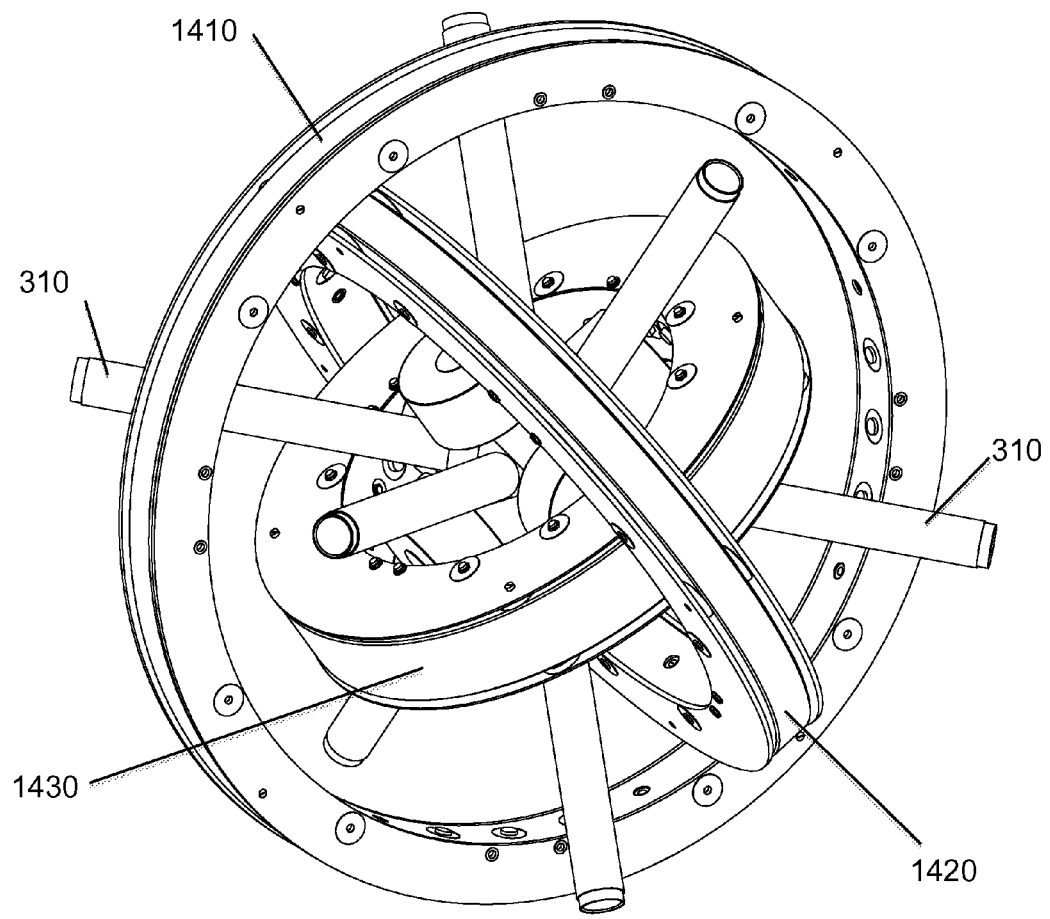
FIG. 14 is a perspective view of the support spokes and inner steering coils mounted on a single central hub and a plurality of ring rotors arranged for use in conjunction with a gyroscopic propulsion apparatus in accordance with a preferred embodiment of the present invention.

Referring now to FIG. 14, a perspective view of the support spokes and inner steering coils mounted on a single central hub and a plurality of ring rotors arranged for use in conjunction with a gyroscopic propulsion apparatus in accordance with a preferred embodiment of the present invention is depicted. As shown in FIG. 14, a ring rotor 1410, a ring rotor 1420 and a ring rotor 1430 are placed in an orthogonal position relative to each other.

Figure 15:
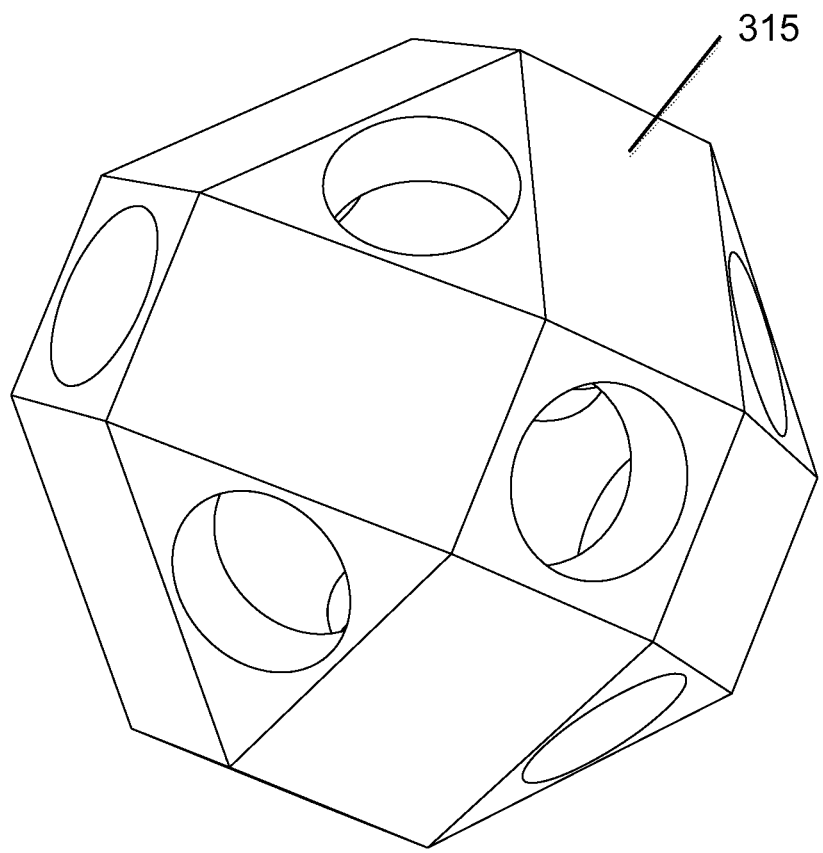
FIG. 15 is a perspective view of a central hub used in conjunction with a gyroscopic propulsion apparatus in accordance with a preferred embodiment of the present invention.

Referring now to FIG. 15, a perspective view of central hub 315 used in conjunction with a gyroscopic propulsion apparatus in accordance with a preferred embodiment of the present invention is depicted. As shown in FIG. 15, central hub 315 has a plurality of apertures that are adapted to receive a plurality of support spokes.

Figure 16:
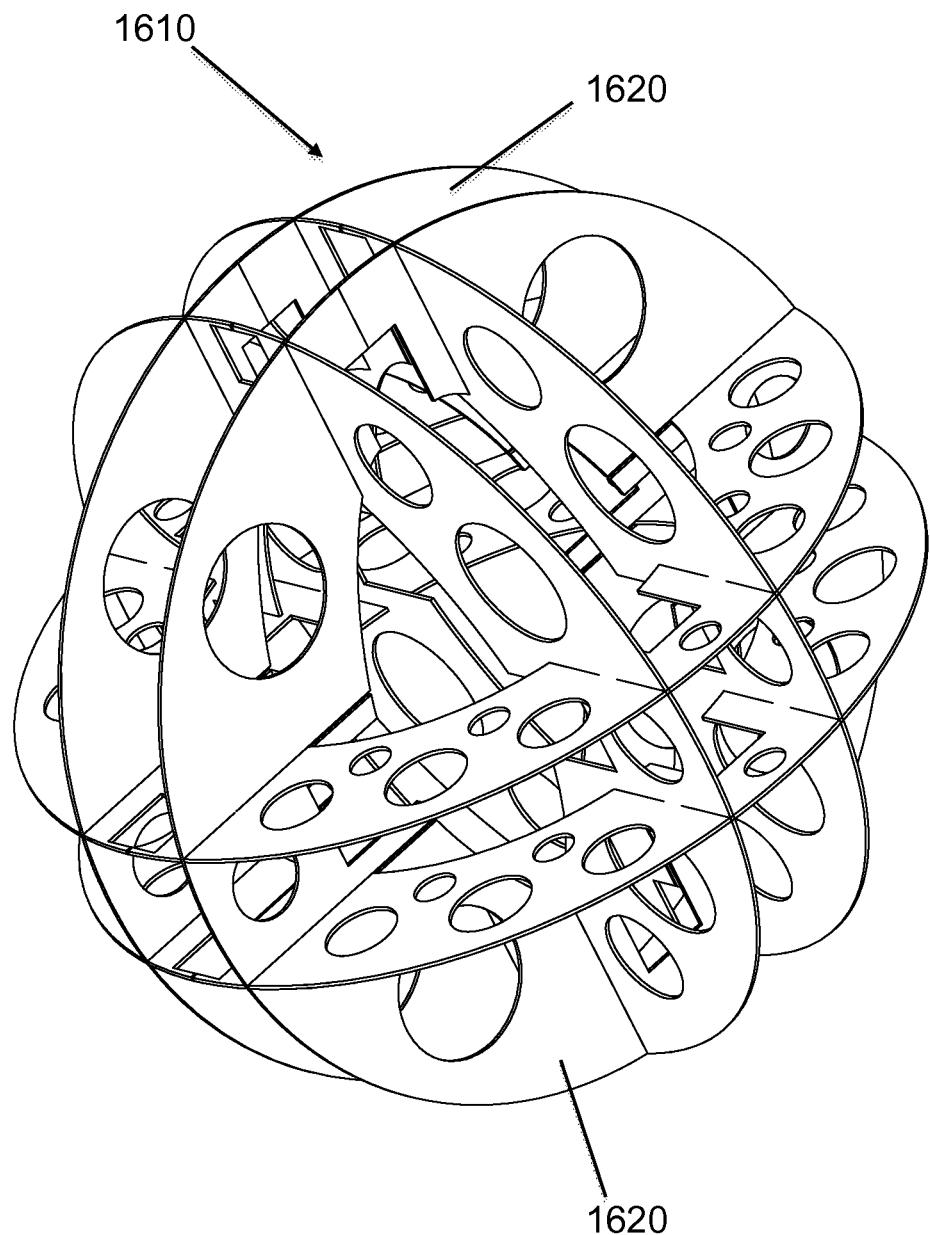
FIG. 16 is a perspective view of a plurality of support pieces arranged as a spherical support pedestal for a plurality of ring rotors used in conjunction with a gyroscopic propulsion apparatus in accordance with a preferred embodiment of the present invention.

Referring now to FIG. 16, a perspective view of a plurality of pedestal support pieces arranged as a spherical support pedestal assembly 1610 for a plurality of ring rotors used in conjunction with a gyroscopic propulsion apparatus in accordance with a preferred embodiment of the present invention is depicted. As shown in FIG. 16, support pedestal assembly 1610 comprises two subassemblies 1620 that, taken together, form support pedestal assembly 1610.

Figure 17:
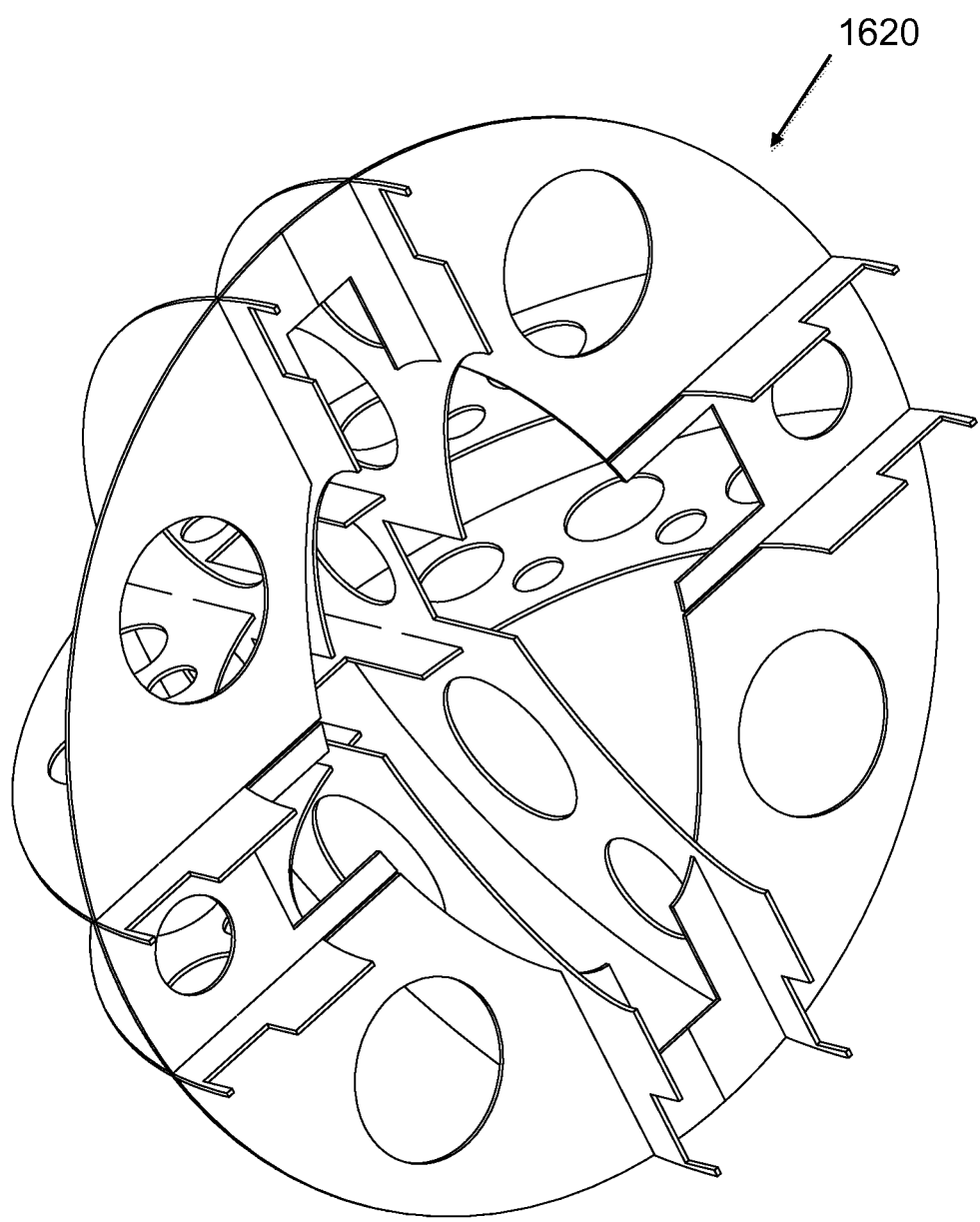
FIG. 17 is a perspective view of one half of the plurality of support pieces in FIG. 16 arranged as a spherical support pedestal for a plurality of ring rotors used in conjunction with a gyroscopic propulsion apparatus in accordance with a preferred embodiment of the present invention.

Referring now to FIG. 17, a perspective view of subassembly 1620 that is one half of the plurality of support pieces in FIG. 16 arranged as part of a spherical support pedestal assembly 1610 for a plurality of ring rotors used in conjunction with a gyroscopic propulsion apparatus in accordance with a preferred embodiment of the present invention is depicted.

Figure 18:
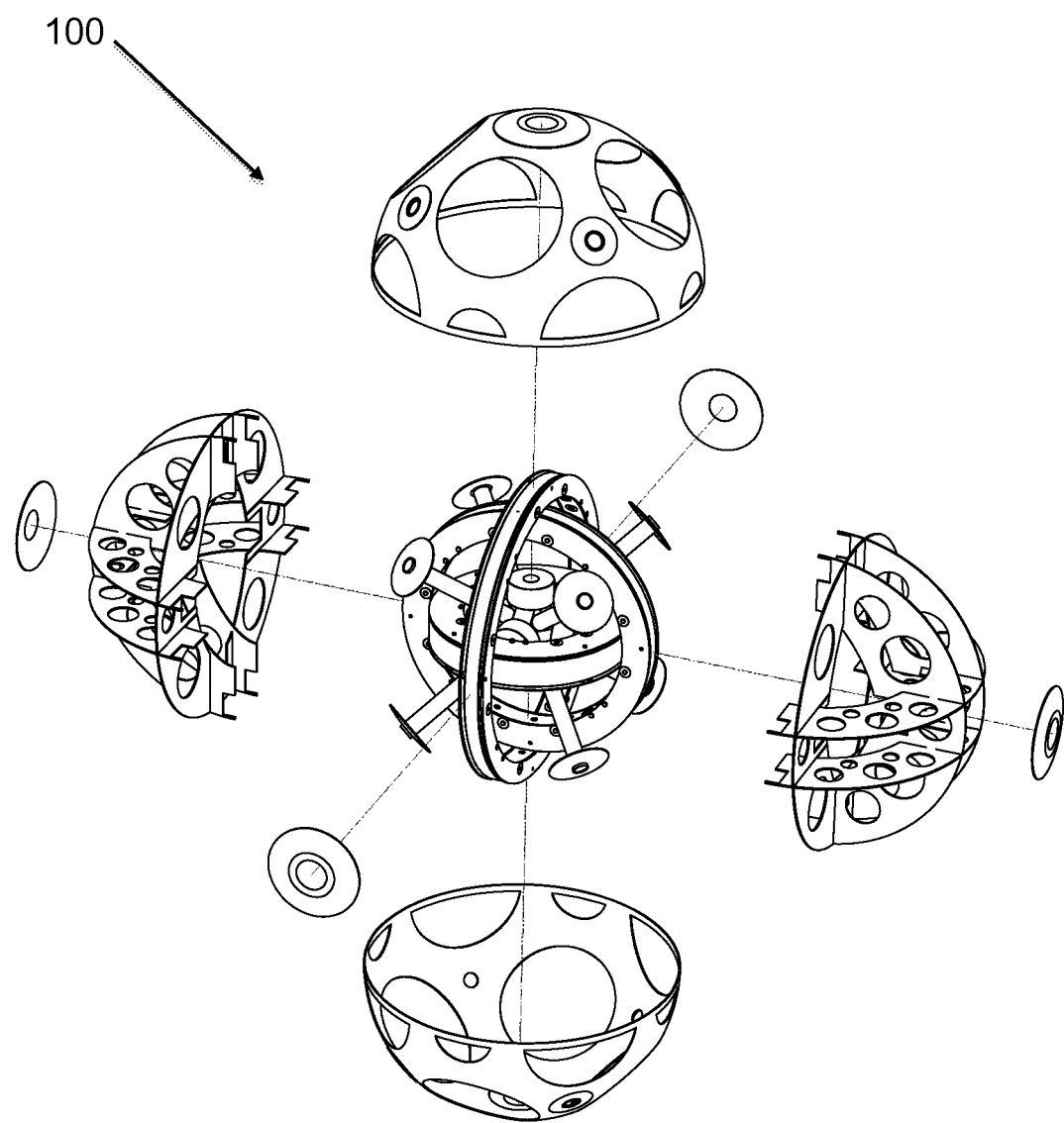
FIG. 18 is an exploded perspective view of the central hub, the support spokes, the ring rotors, the inner and outer steering coils, the support pedestals and the containment shells used in conjunction with a gyroscopic propulsion apparatus in accordance with a preferred embodiment of the present invention.

Referring now to FIG. 18, an exploded perspective view of the central hub, the support spokes, the ring rotors, the inner and outer steering coils, the support pedestals and the containment shells used in conjunction with a gyroscopic propulsion apparatus in accordance with a preferred embodiment of the present invention is depicted.

Figure 19:
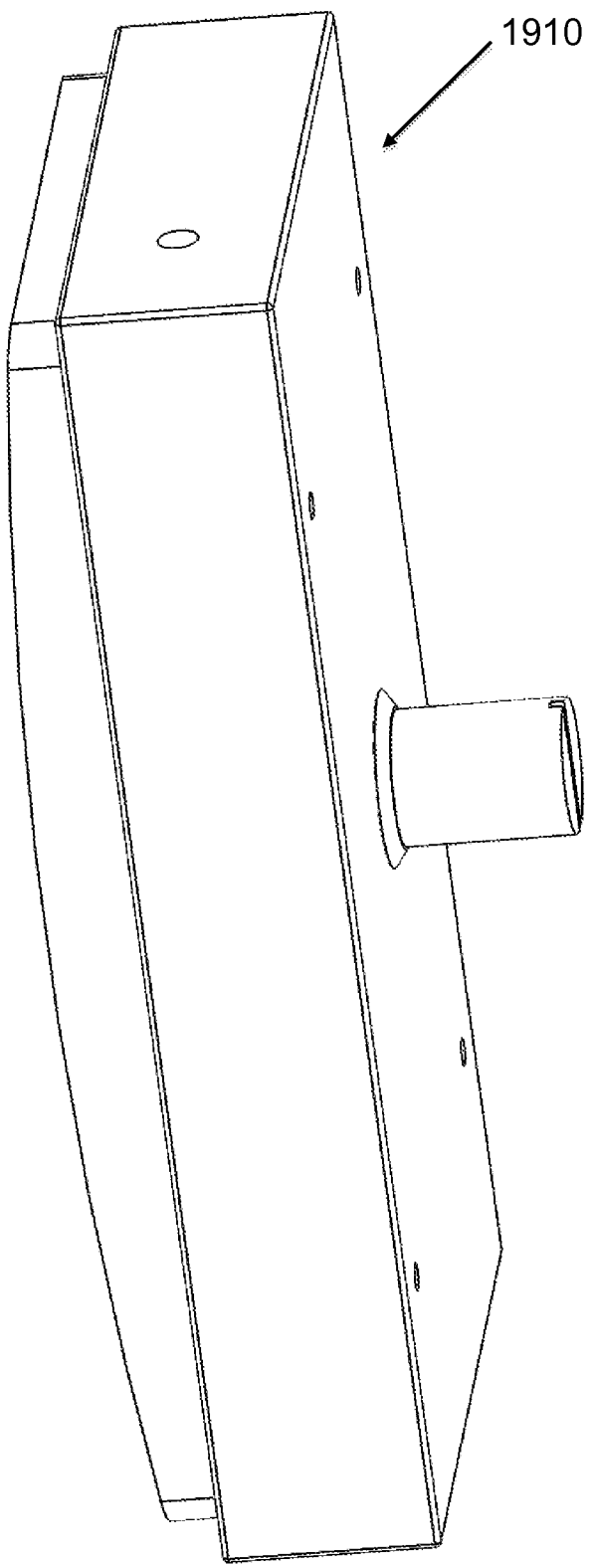
FIG. 19 is a perspective view of an air bearing suitable for use in conjunction with a gyroscopic propulsion apparatus in accordance with a preferred embodiment of the present invention.

Referring now to FIG. 19, a perspective view of an air bearing 1910 suitable for use in conjunction with a gyroscopic propulsion apparatus in accordance with a preferred embodiment of the present invention is depicted.

Figure 20:
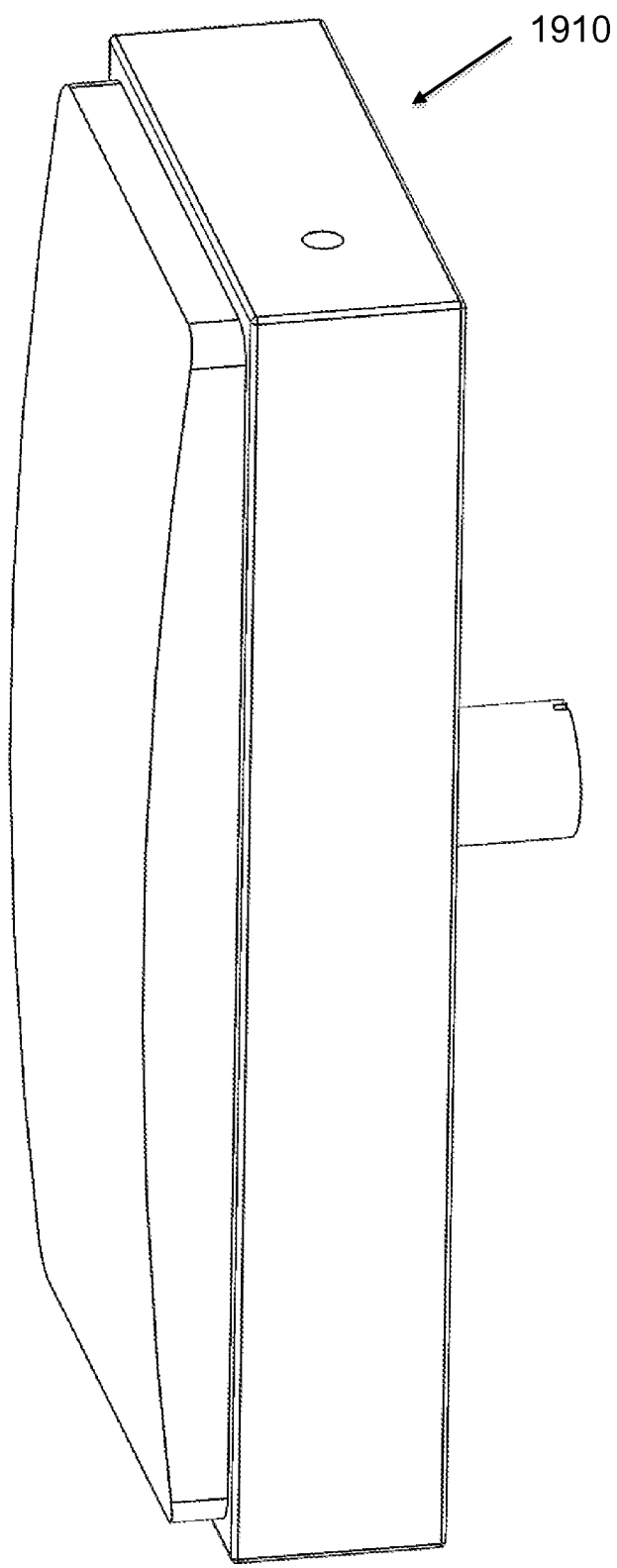
FIG. 20 is an alternative perspective view of an air bearing suitable for use in conjunction with a gyroscopic propulsion apparatus in accordance with a preferred embodiment of the present invention.
Figure 21:
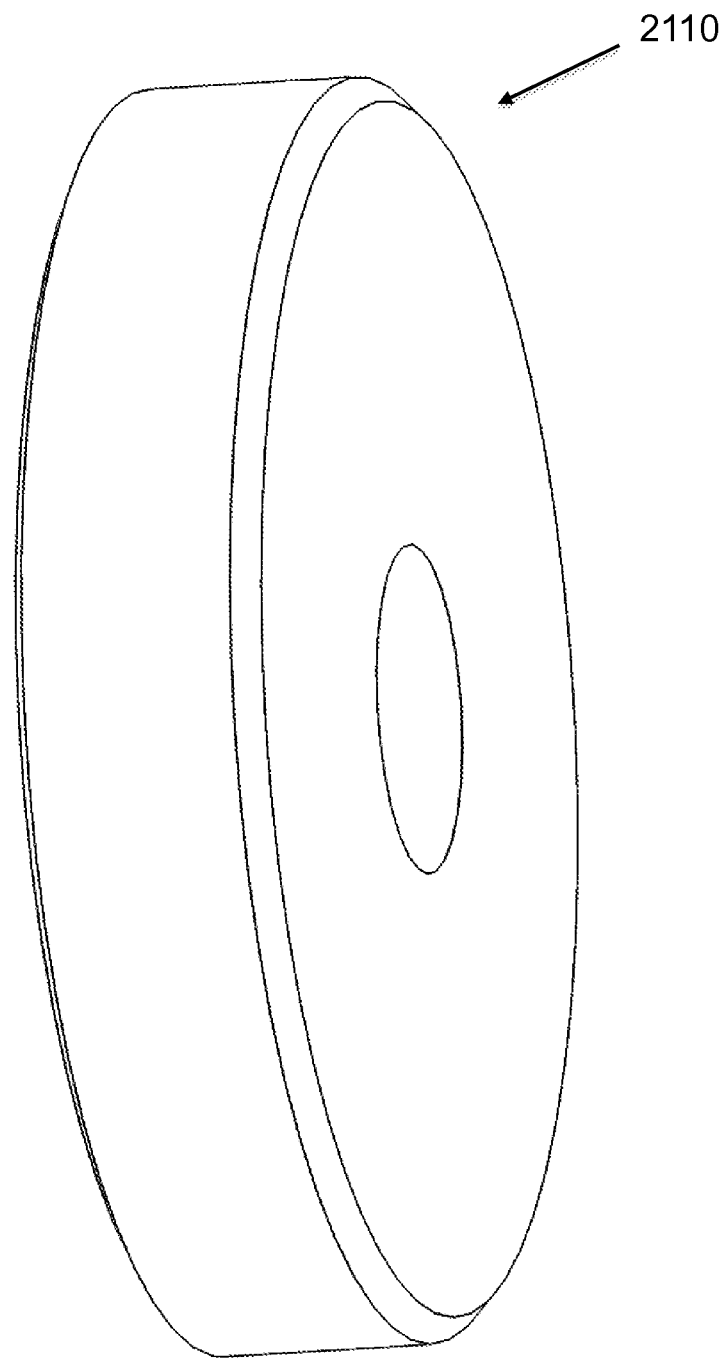
FIG. 21 is a perspective view of an air bearing suitable for use in conjunction with a gyroscopic propulsion apparatus in accordance with a preferred embodiment of the present invention.

Referring now to FIG. 20, an alternative perspective view of an air bearing 1910 suitable for use in conjunction with a gyroscopic propulsion apparatus in accordance with a preferred embodiment of the present invention;

Referring now to FIG. 21, a perspective view of an air bearing 2110 suitable for use in conjunction with a gyroscopic propulsion apparatus in accordance with a preferred embodiment of the present invention is depicted.

Figure 22:
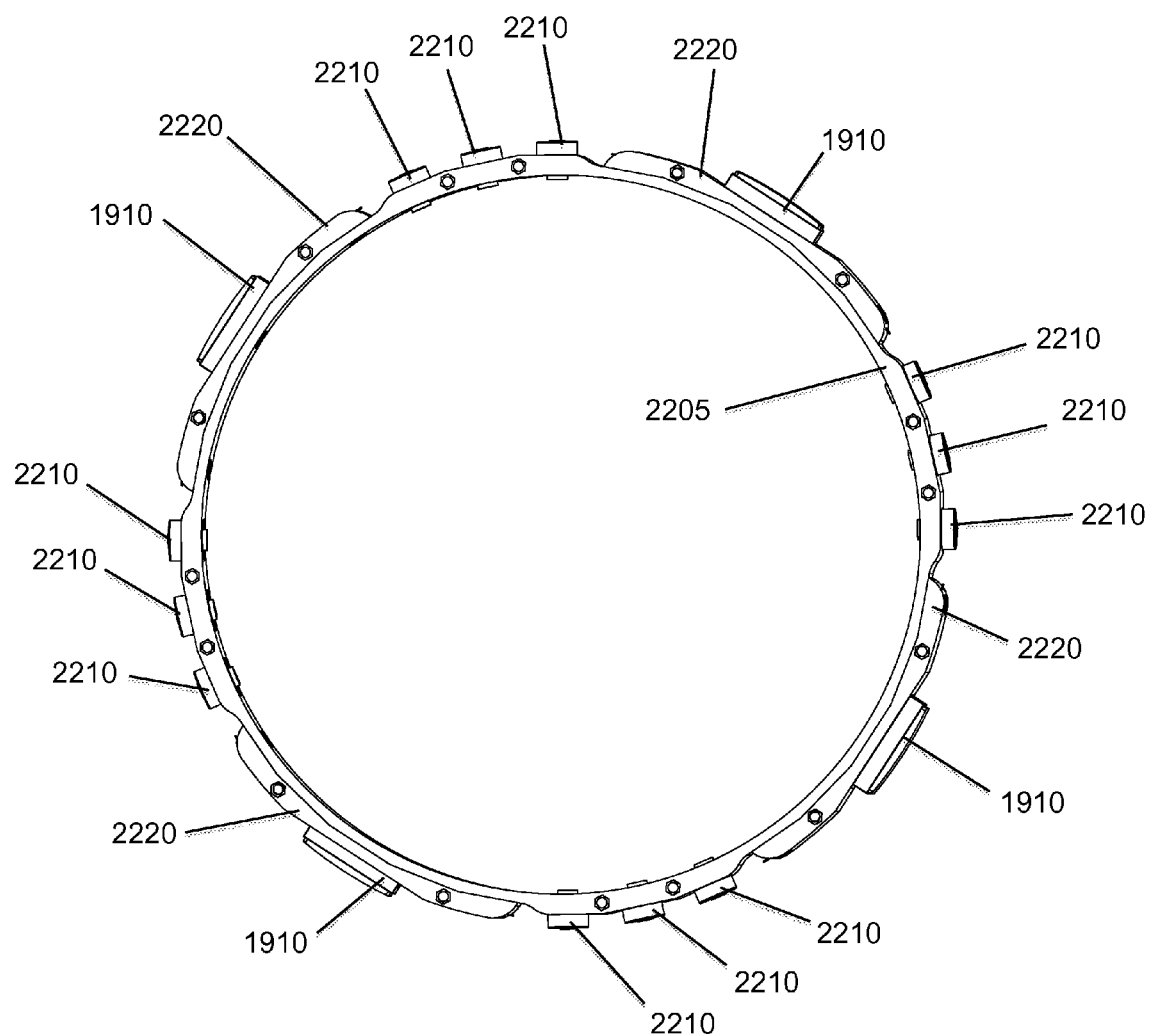
FIG. 22 is a side view of a ring motor inner race holding four radial air bearings and their respective mounting brackets with three sets of cylindrical drive coils mounted on an inner radial band for use in conjunction with a gyroscopic propulsion apparatus in accordance with a preferred embodiment of the present invention.

Referring now to FIG. 22, a side view of a ring motor inner race assembly comprising four radial air bearings 1910 and their respective mounting brackets 2220 with three sets of cylindrical drive coils 2210 mounted on an inner radial band 2205 for use in conjunction with a gyroscopic propulsion apparatus in accordance with a preferred embodiment of the present invention is depicted.

Figure 23:
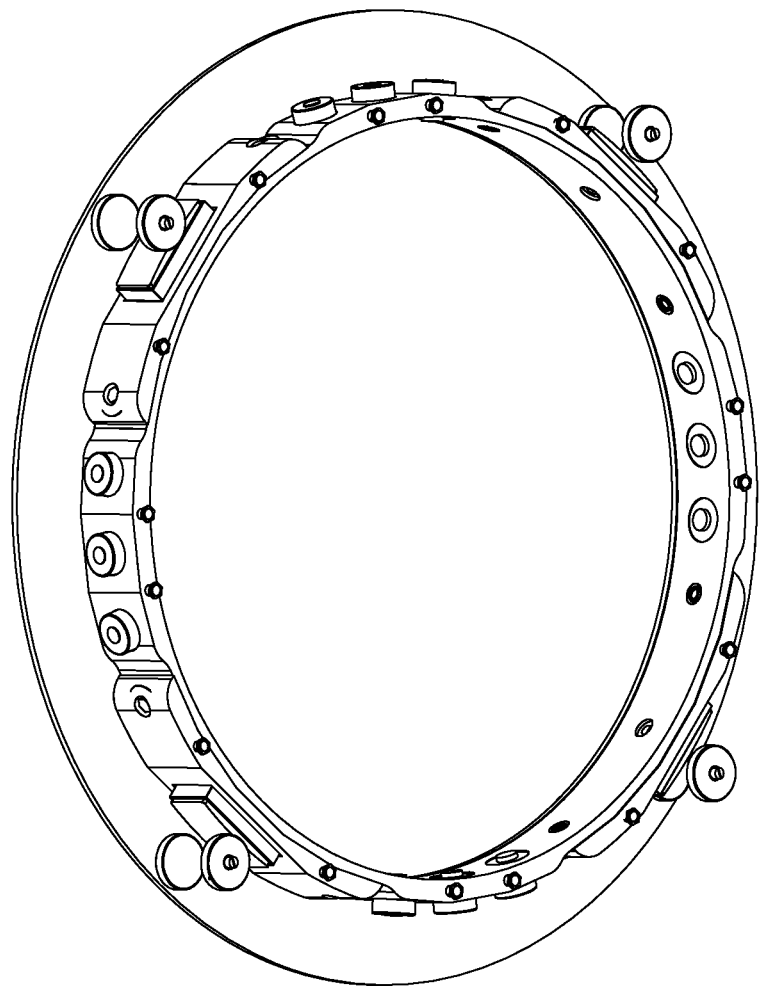
FIG. 23 is a perspective view of an open stator with four radial air bearings for use in conjunction with a gyroscopic propulsion apparatus in accordance with a preferred embodiment of the present invention.

Referring now to FIG. 23, a perspective view of an open stator with four radial air bearings for use in conjunction with a gyroscopic propulsion apparatus in accordance with a preferred embodiment of the present invention is depicted.

Figure 24:
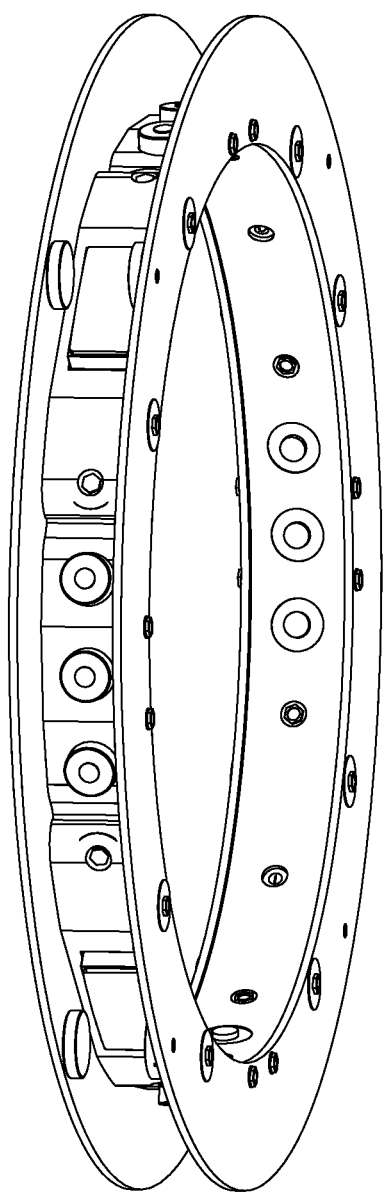
FIG. 24 is a perspective view of a portion of a ring motor suitable for use in conjunction with a gyroscopic propulsion apparatus in accordance with a preferred embodiment of the present invention.

Referring now to FIG. 24, a perspective view of a portion of a ring motor suitable for use in conjunction with a gyroscopic propulsion apparatus in accordance with a preferred embodiment of the present invention is depicted.

Figure 25:
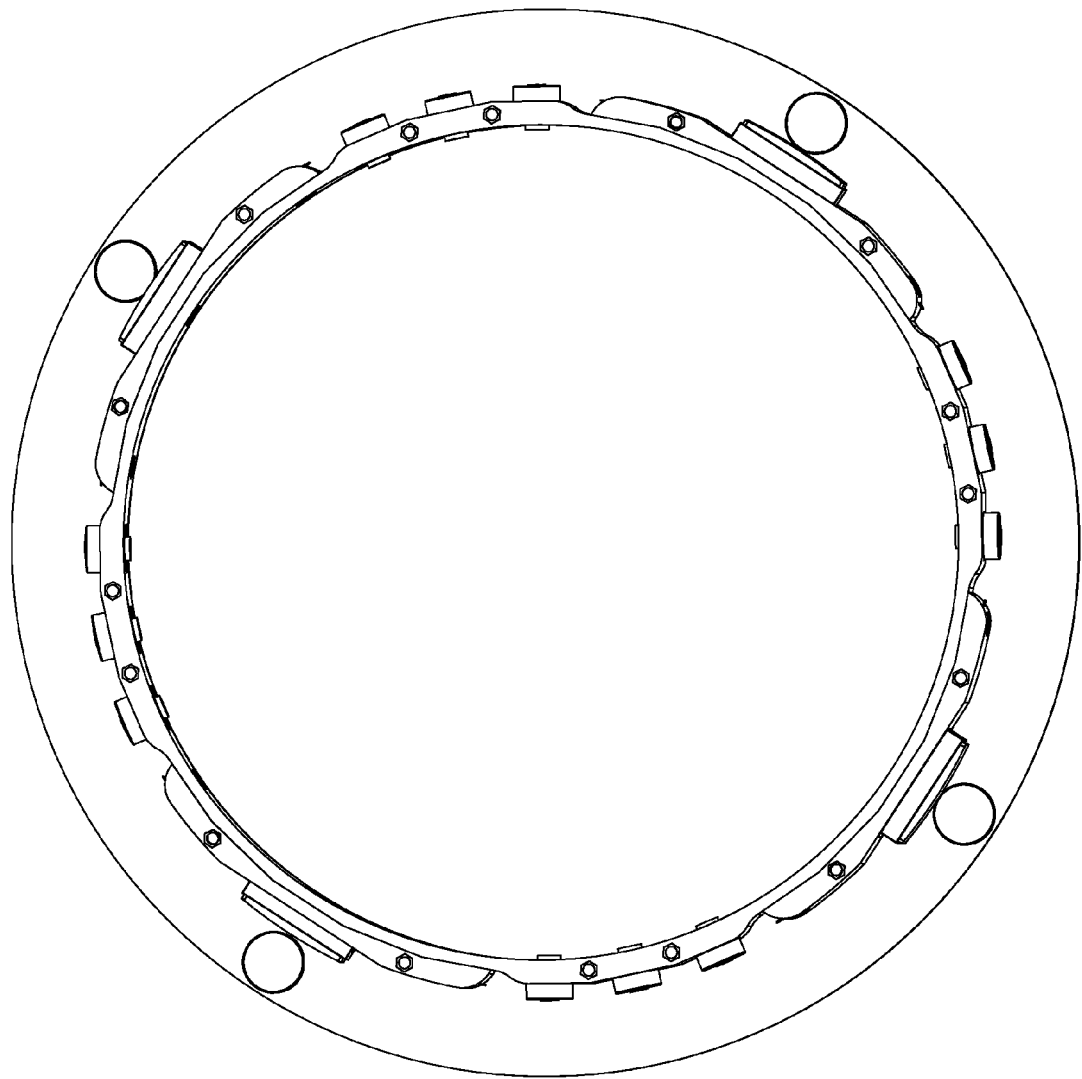
FIG. 25 is a plan view of a portion of a ring motor suitable for use in conjunction with a gyroscopic propulsion apparatus in accordance with a preferred embodiment of the present invention.

Referring now to FIG. 25, a plan view of a portion of a ring motor suitable for use in conjunction with a gyroscopic propulsion apparatus in accordance with a preferred embodiment of the present invention is depicted.

Figure 26:
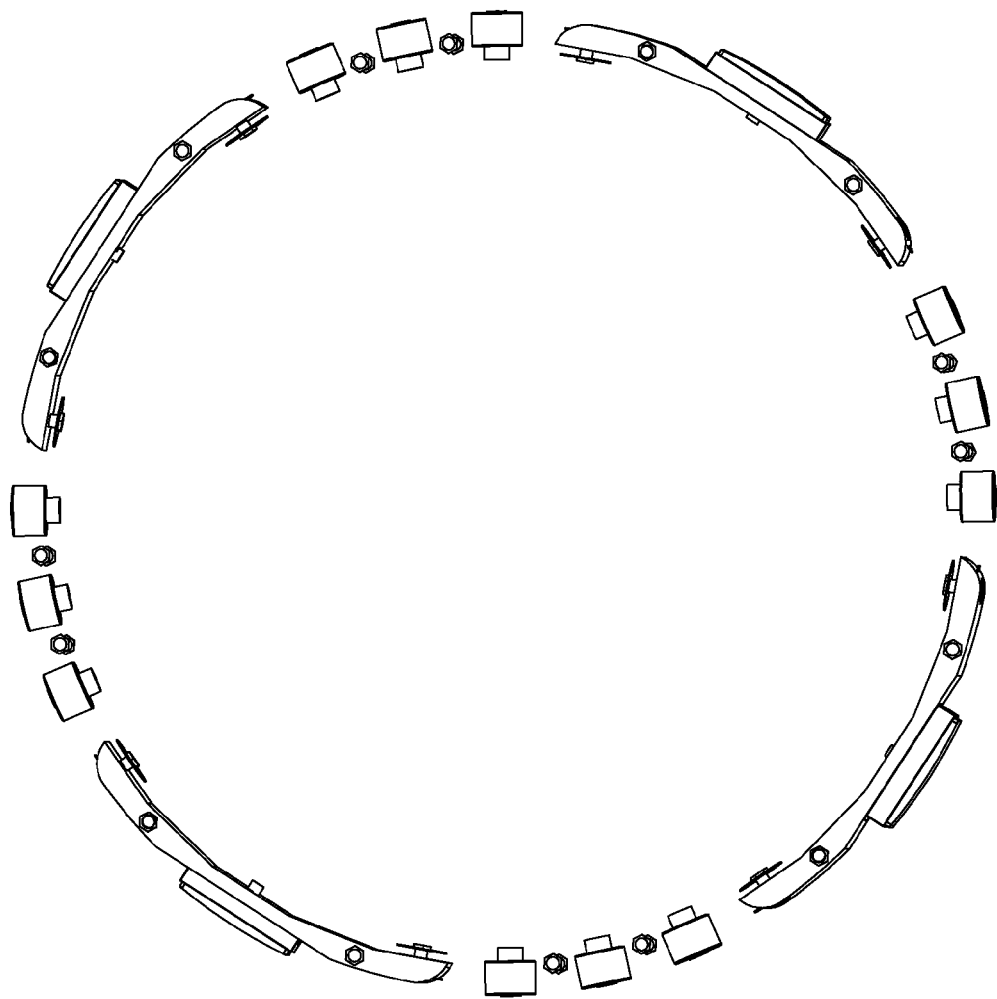
FIG. 26 is a plan view of several components of a ring motor suitable for use in conjunction with a gyroscopic propulsion apparatus in accordance with a preferred embodiment of the present invention.

Referring now to FIG. 26, a plan view of several components of a ring motor suitable for use in conjunction with a gyroscopic propulsion apparatus in accordance with a preferred embodiment of the present invention is depicted.

Figure 27:
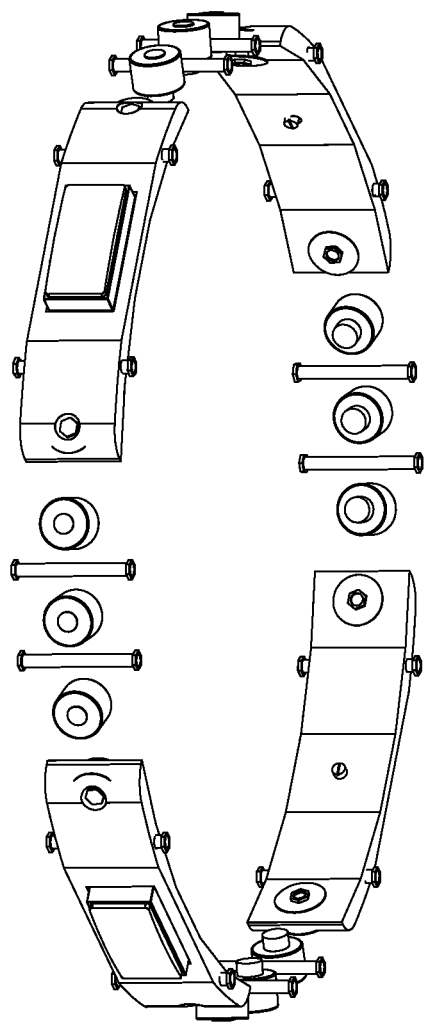
FIG. 27 is a perspective view of several components of a ring motor suitable for use in conjunction with a gyroscopic propulsion apparatus in accordance with a preferred embodiment of the present invention.

Referring now to FIG. 27, a perspective view of several components of a ring motor suitable for use in conjunction with a gyroscopic propulsion apparatus in accordance with a preferred embodiment of the present invention is depicted.

Figure 28:
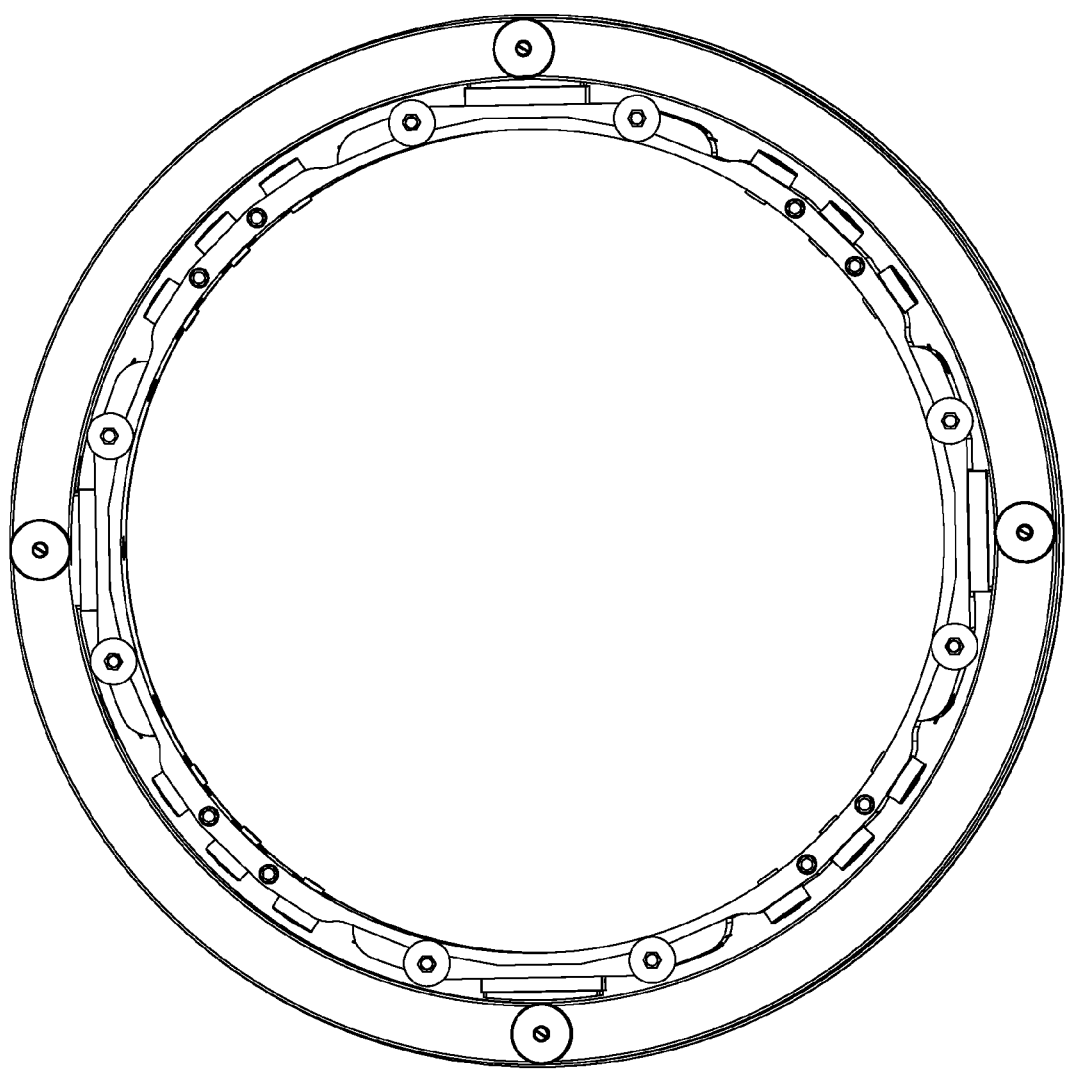
FIG. 28 is a plan view of a ring rotor positioned with several components of a ring motor suitable for use in conjunction with a gyroscopic propulsion apparatus in accordance with a preferred embodiment of the present invention.

Referring now to FIG. 28, a plan view of a ring rotor positioned with several components of a ring motor suitable for use in conjunction with a gyroscopic propulsion apparatus in accordance with a preferred embodiment of the present invention is depicted.

Figure 29:
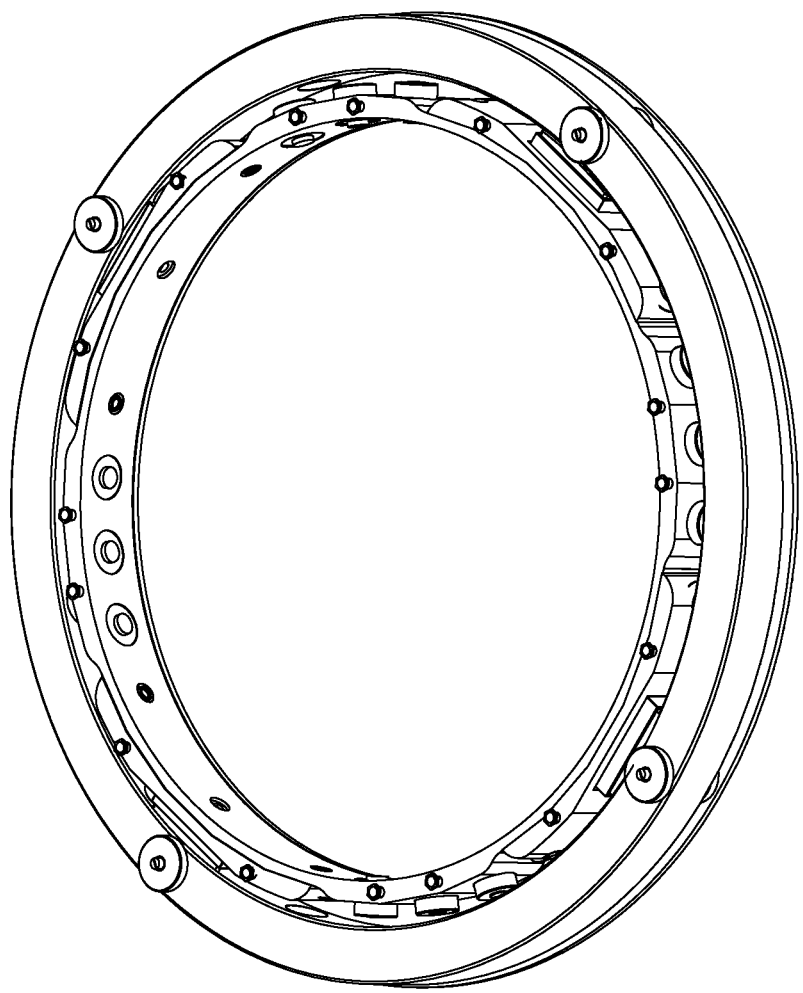
FIG. 29 is a perspective view of a ring rotor positioned with several components of a ring motor suitable for use in conjunction with a gyroscopic propulsion apparatus in accordance with a preferred embodiment of the present invention.

Referring now to FIG. 29, a perspective view of a ring rotor positioned with several components of a ring motor suitable for use in conjunction with a gyroscopic propulsion apparatus in accordance with a preferred embodiment of the present invention is depicted.

Figure 30:
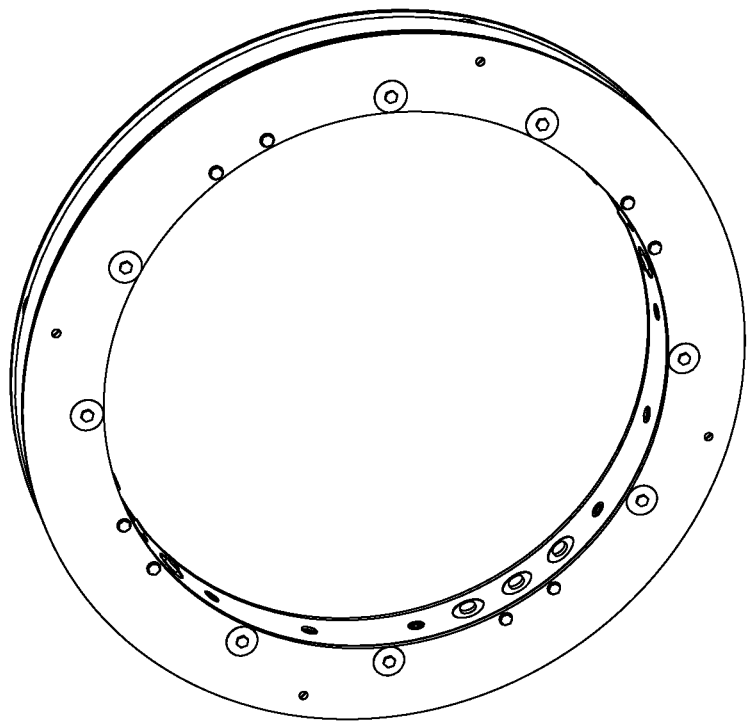
FIG. 30 is a perspective view of several components of a ring motor suitable for use in conjunction with a gyroscopic propulsion apparatus in accordance with a preferred embodiment of the present invention.

Referring now to FIG. 30, a perspective view of a ring motor suitable for use in conjunction with a gyroscopic propulsion apparatus in accordance with a preferred embodiment of the present invention is depicted.

Figure 31:
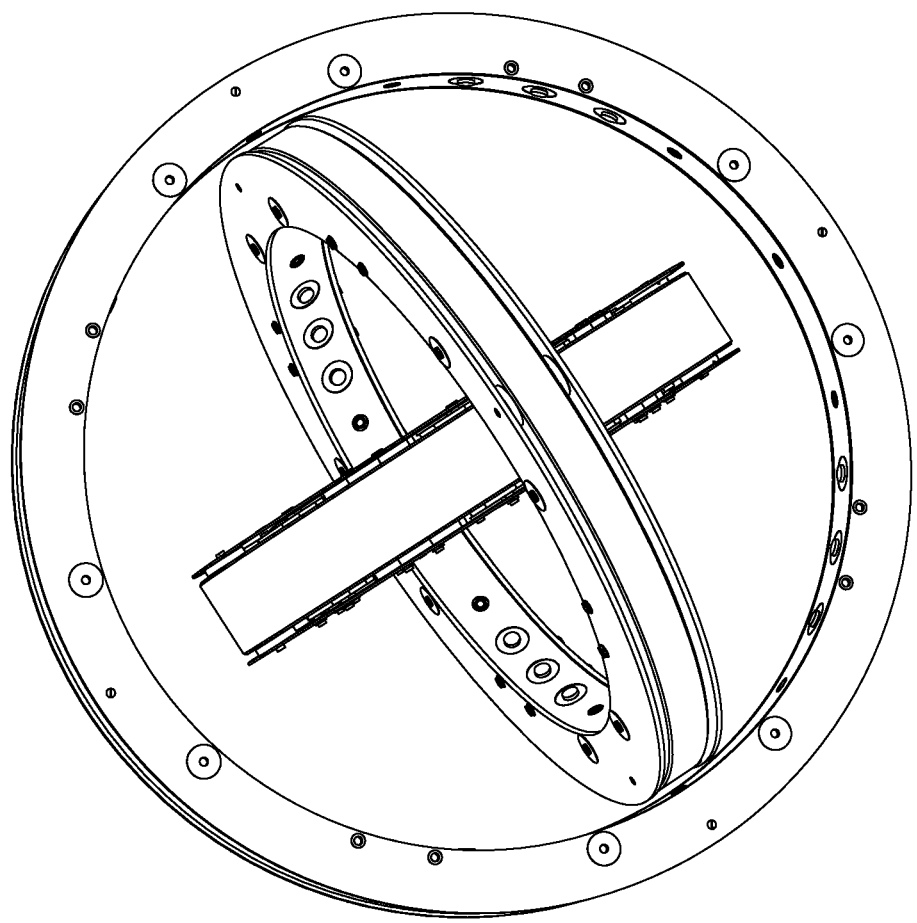
FIG. 31 is a perspective view of three ring motors positioned for use in conjunction with a gyroscopic propulsion apparatus in accordance with a preferred embodiment of the present invention.

Referring now to FIG. 31, a perspective view of three ring motors positioned for use in conjunction with a gyroscopic propulsion apparatus in accordance with a preferred embodiment of the present invention is depicted.

Figure 32:
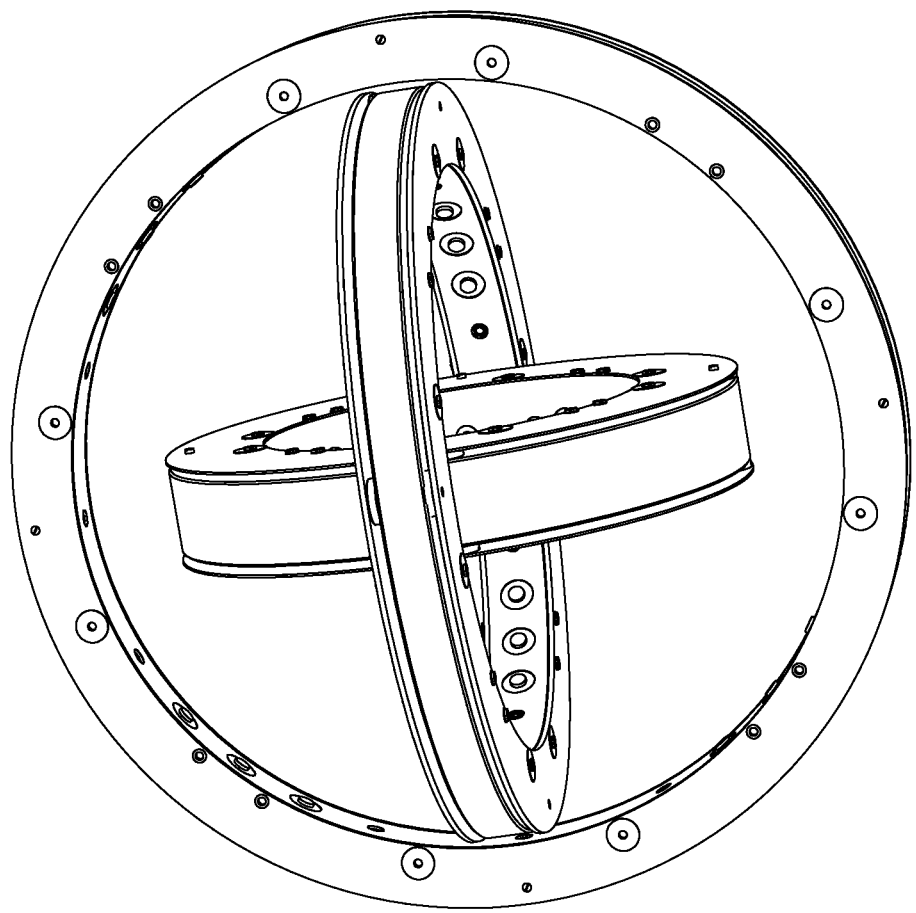
FIG. 32 is an alternative perspective view of three ring motors positioned for use in conjunction with a gyroscopic propulsion apparatus in accordance with a preferred embodiment of the present invention.

Referring now to FIG. 32, an alternative perspective view of three ring motors positioned for use in conjunction with a gyroscopic propulsion apparatus in accordance with a preferred embodiment of the present invention is depicted.

Figure 33:
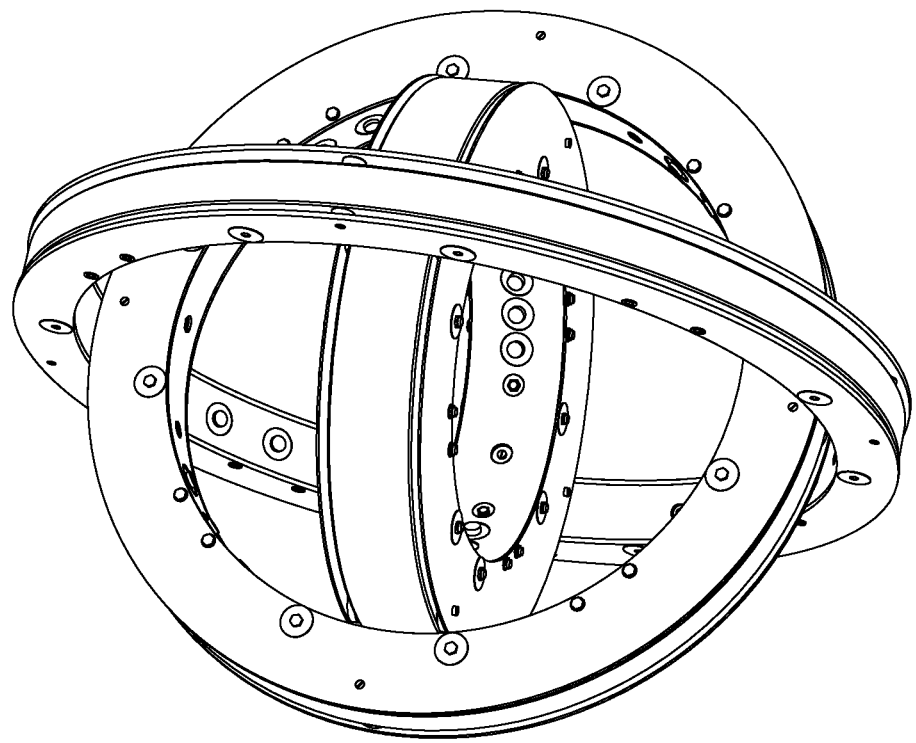
FIG. 33 is an alternative perspective view of three ring motors positioned for use in conjunction with a gyroscopic propulsion apparatus in accordance with a preferred embodiment of the present invention.

Referring now to FIG. 33, an alternative perspective view of three ring motors positioned for use in conjunction with a gyroscopic propulsion apparatus in accordance with a preferred embodiment of the present invention is depicted.

Figure 34:
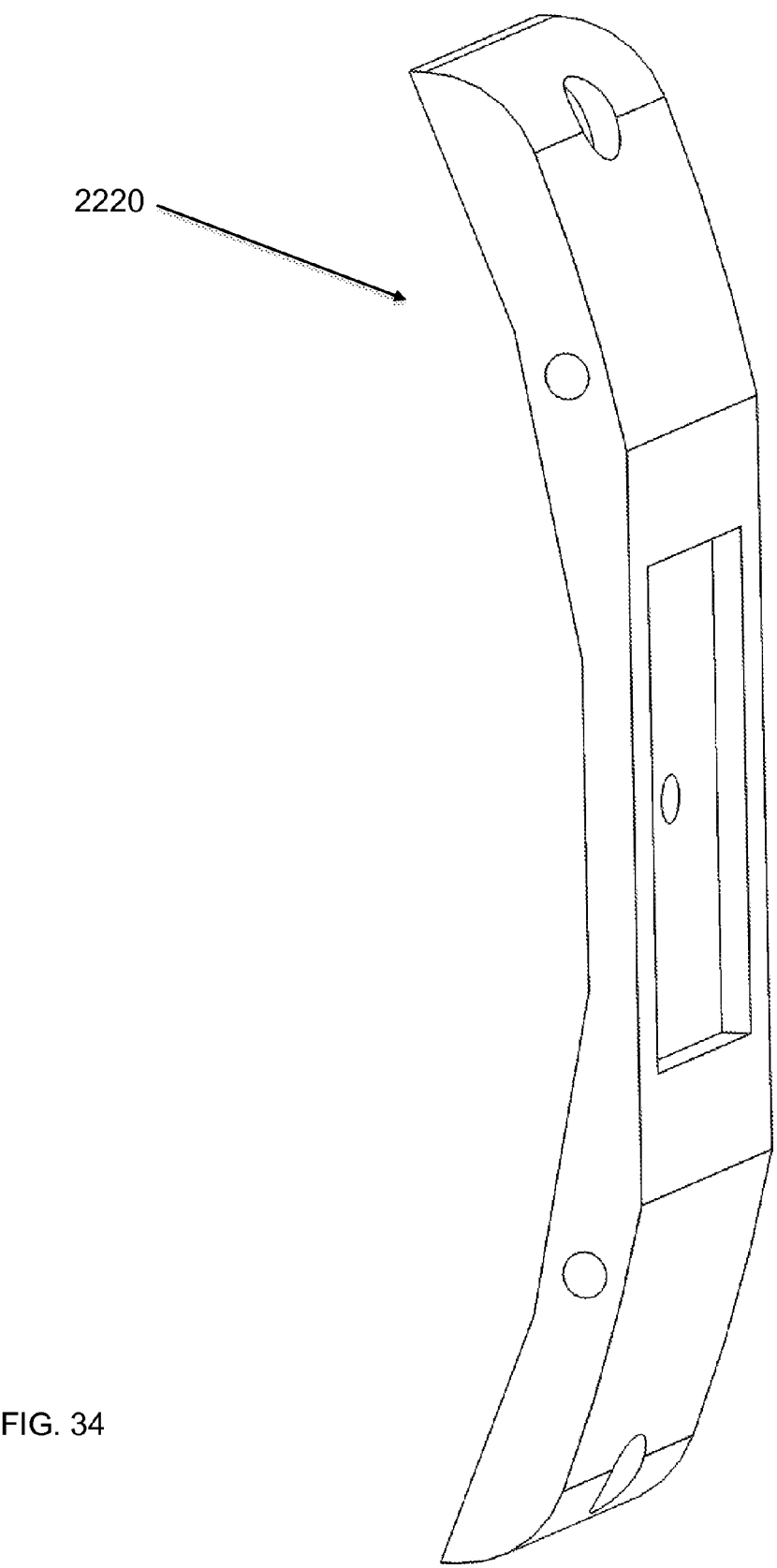
FIG. 34 is a perspective view of an air bearing mounting bracket suitable for mounting an air bearing for use in conjunction with a gyroscopic propulsion apparatus in accordance with a preferred embodiment of the present invention.

Referring now to FIG. 34, a perspective view of an air bearing mounting bracket 2220 suitable for mounting an air bearing for use in conjunction with a gyroscopic propulsion apparatus in accordance with a preferred embodiment of the present invention is depicted.

Figure 35:
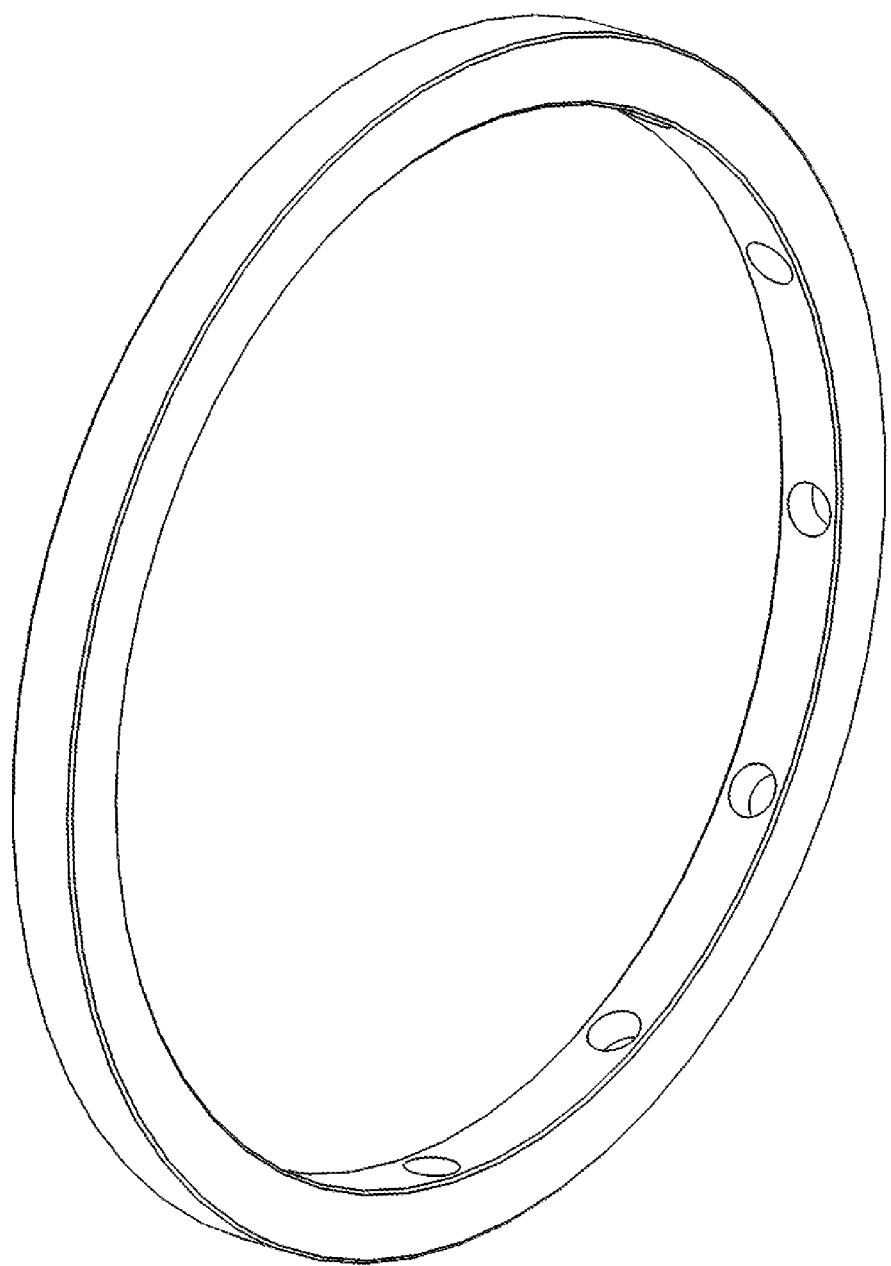
FIG. 35 is a perspective view of a ring rotor containing apertures ready for the insertion of copper plugs for use in a ring motor used in conjunction with a gyroscopic propulsion apparatus in accordance with a preferred embodiment of the present invention.

Referring now to FIG. 35, a perspective view of a ring rotor comprising a plurality of apertures ready for the insertion of copper plugs for use in a ring motor used in conjunction with a gyroscopic propulsion apparatus in accordance with a preferred embodiment of the present invention is depicted.

Figure 36:
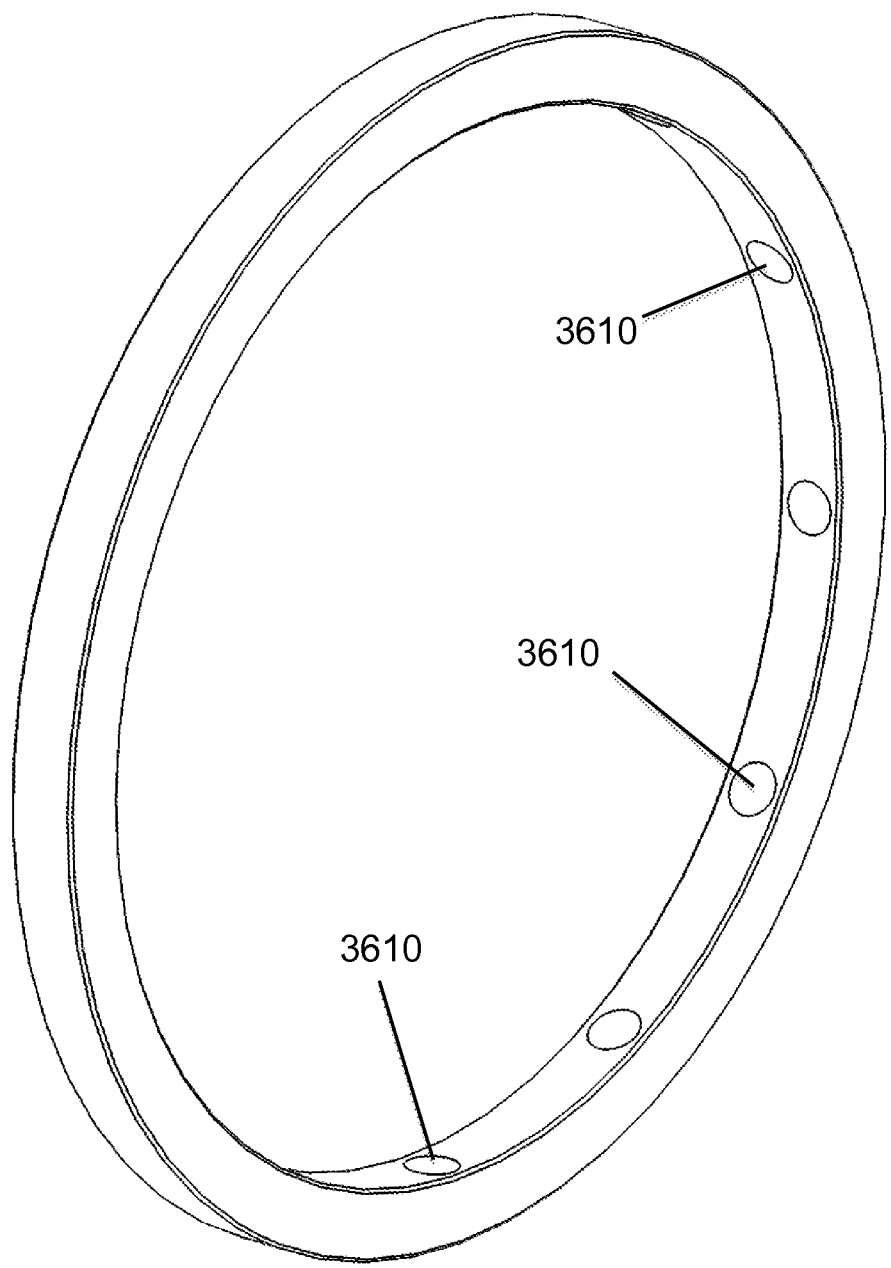
FIG. 36 is a perspective view of the ring rotor of FIG. 35 with copper plugs inserted into the apertures for use in a ring motor used in conjunction with a gyroscopic propulsion apparatus in accordance with a preferred embodiment of the present invention.

Referring now to FIG. 36, a perspective view of the ring rotor of FIG. 35 with a plurality of copper plugs 3610 inserted into the apertures for use in a ring motor used in conjunction with a gyroscopic propulsion apparatus in accordance with a preferred embodiment of the present invention is depicted.

Figure 37:
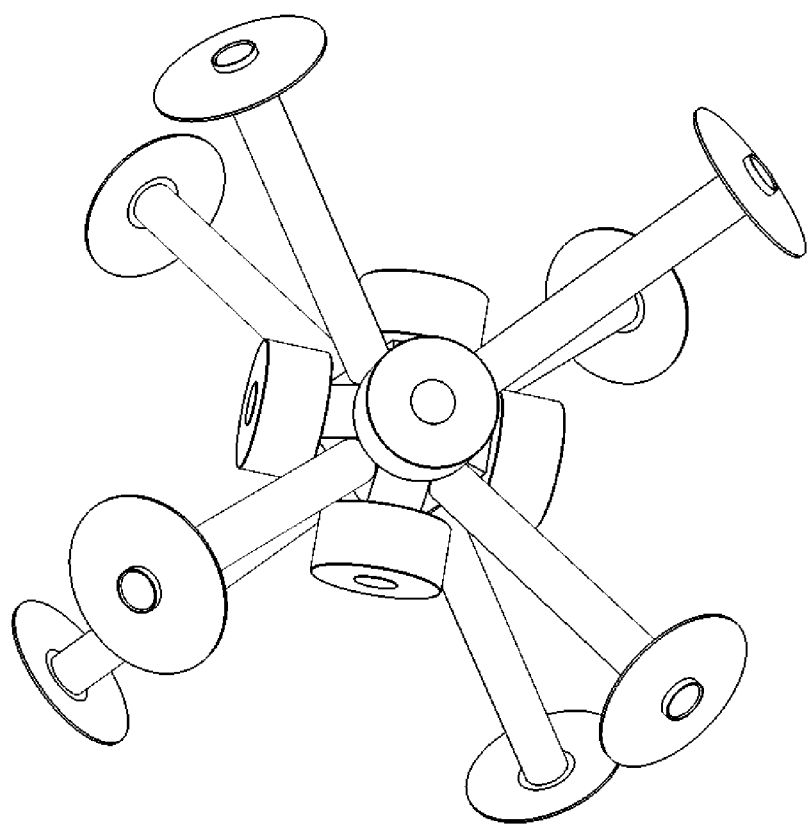
FIG. 37 is a perspective view of a central hub with the six cylindrical drive coils and eight support spokes used in conjunction with a gyroscopic propulsion apparatus in accordance with a preferred embodiment of the present invention.

Referring now to FIG. 37, a perspective view of a central hub with the six cylindrical steering coils and eight support spokes used in conjunction with a gyroscopic propulsion apparatus in accordance with a preferred embodiment of the present invention is depicted.

Figure 38:
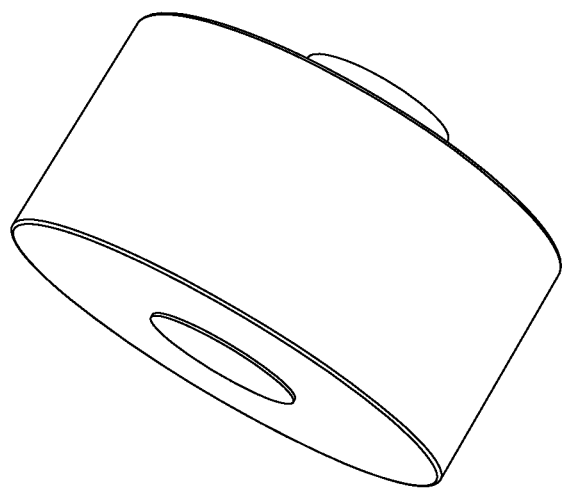
FIG. 38 is a perspective view of a drive coil used in conjunction with a gyroscopic propulsion apparatus in accordance with a preferred embodiment of the present invention.

Referring now to FIG. 38, a perspective view of a drive coil used in conjunction with a gyroscopic propulsion apparatus in accordance with a preferred embodiment of the present invention is depicted. It should be noted that the drive coils and the inner steering coils are substantially the same, with the only differences being the size (e.g., number of windings, etc.) used for each type of coil.

Figure 39:
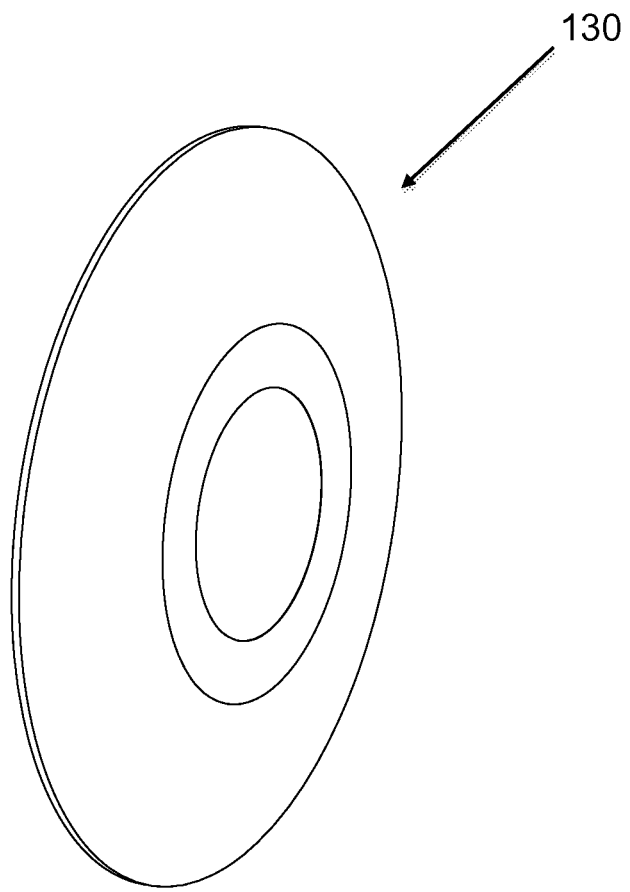
FIG. 39 is a perspective view of an outer steering coil used in conjunction with a gyroscopic propulsion apparatus in accordance with a preferred embodiment of the present invention.
Figure 40:
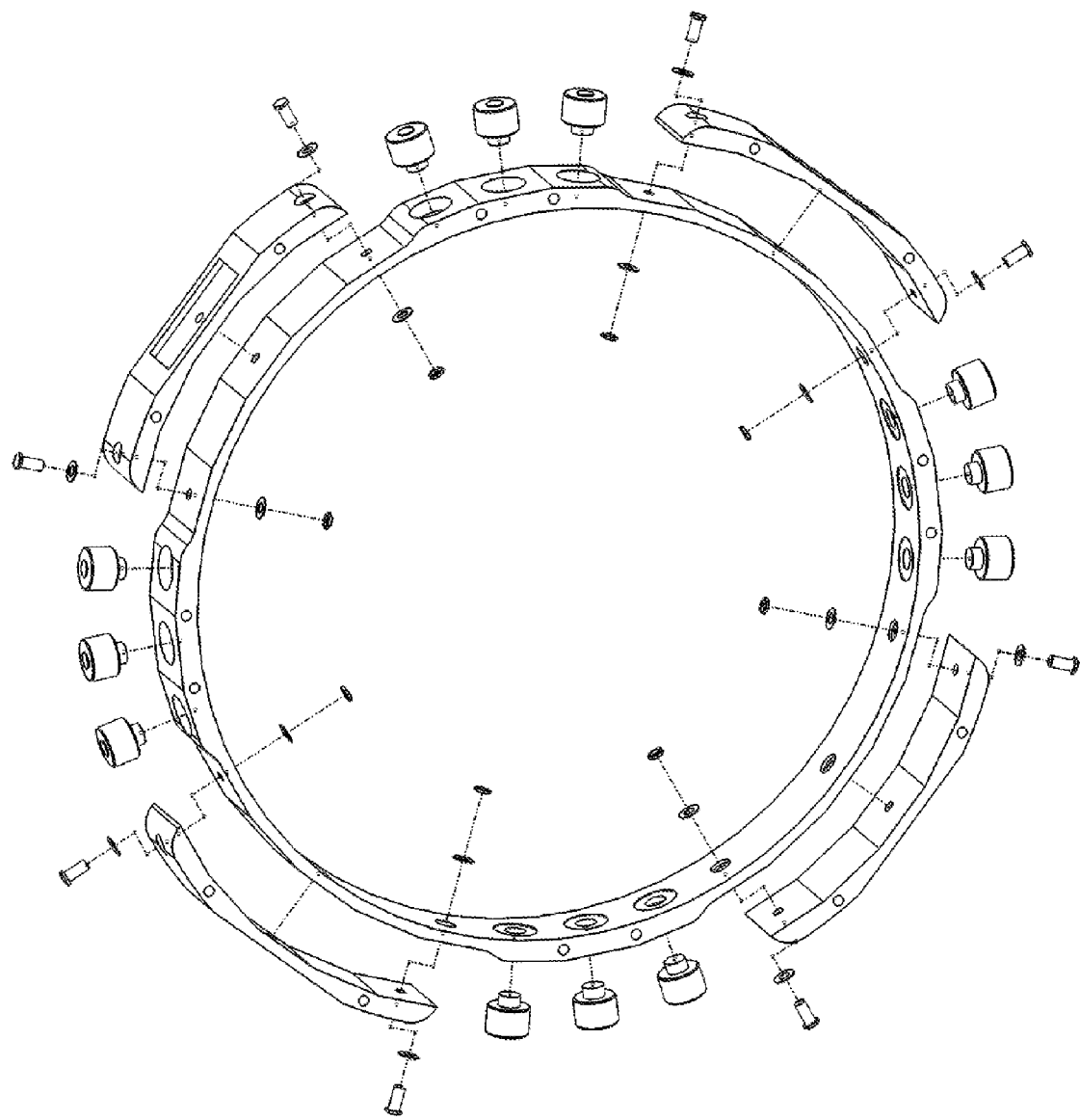
FIG. 40 is an exploded perspective view of various components used in a ring motor used in conjunction with a gyroscopic propulsion apparatus in accordance with a preferred embodiment of the present invention.

Referring now to FIG. 39, a perspective view of an outer steering coil used in conjunction with a gyroscopic propulsion apparatus in accordance with a preferred embodiment of the present invention;

Referring now to FIG. 40, an exploded perspective view of various components used in a ring motor used in conjunction with a gyroscopic propulsion apparatus in accordance with a preferred embodiment of the present invention is depicted.

Figure 41:
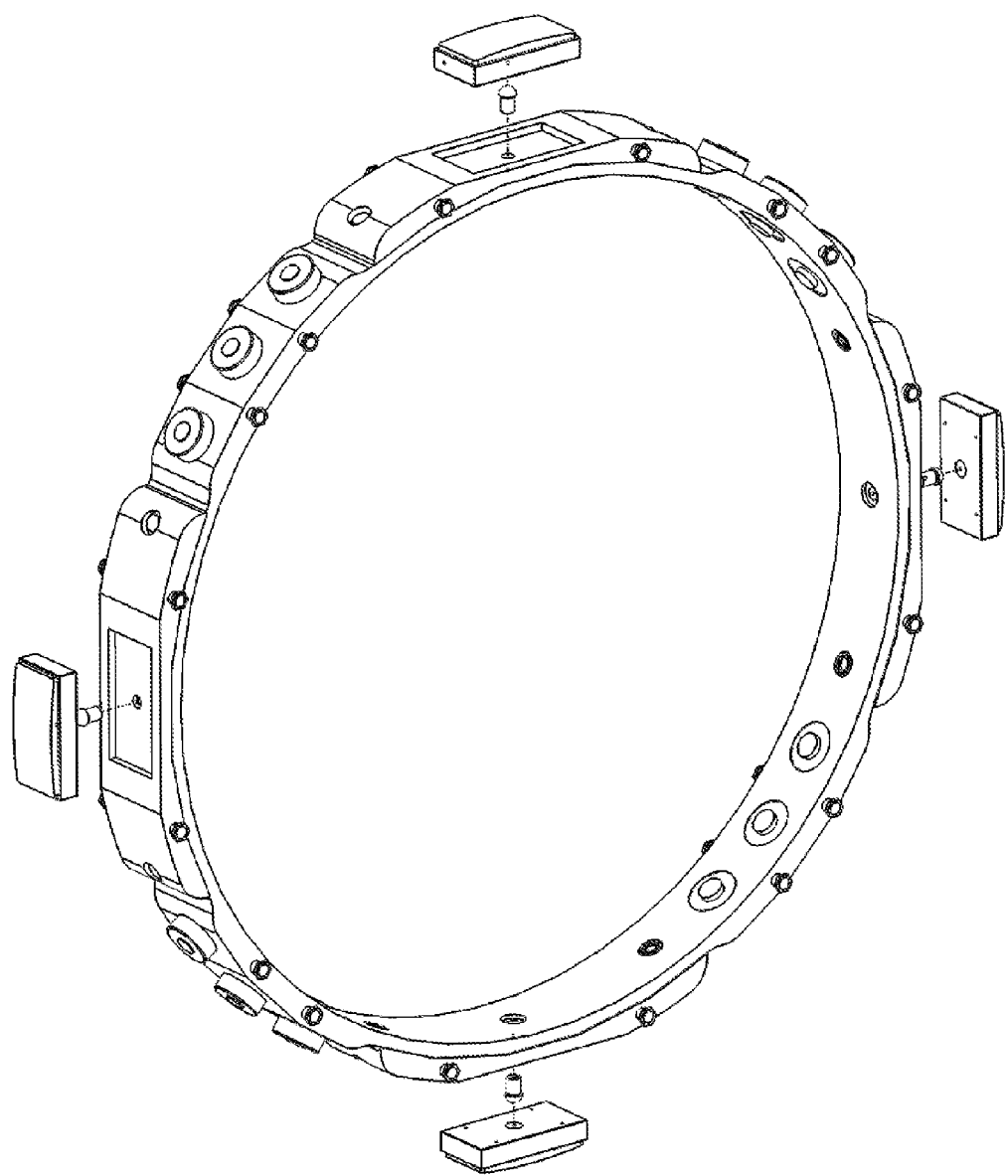
FIG. 41 is a perspective view of a ring rotor inner race with air bearings positioned for placement into air bearing mounting brackets and the inner radial surface of the race for use in conjunction with a gyroscopic propulsion apparatus in accordance with a preferred embodiment of the present invention.

Referring now to FIG. 41, a perspective view of a ring rotor inner race with air bearings positioned for placement into air bearing mounting brackets and the inner radial surface of the race for use in conjunction with a gyroscopic propulsion apparatus in accordance with a preferred embodiment of the present invention is depicted.

Figure 42:
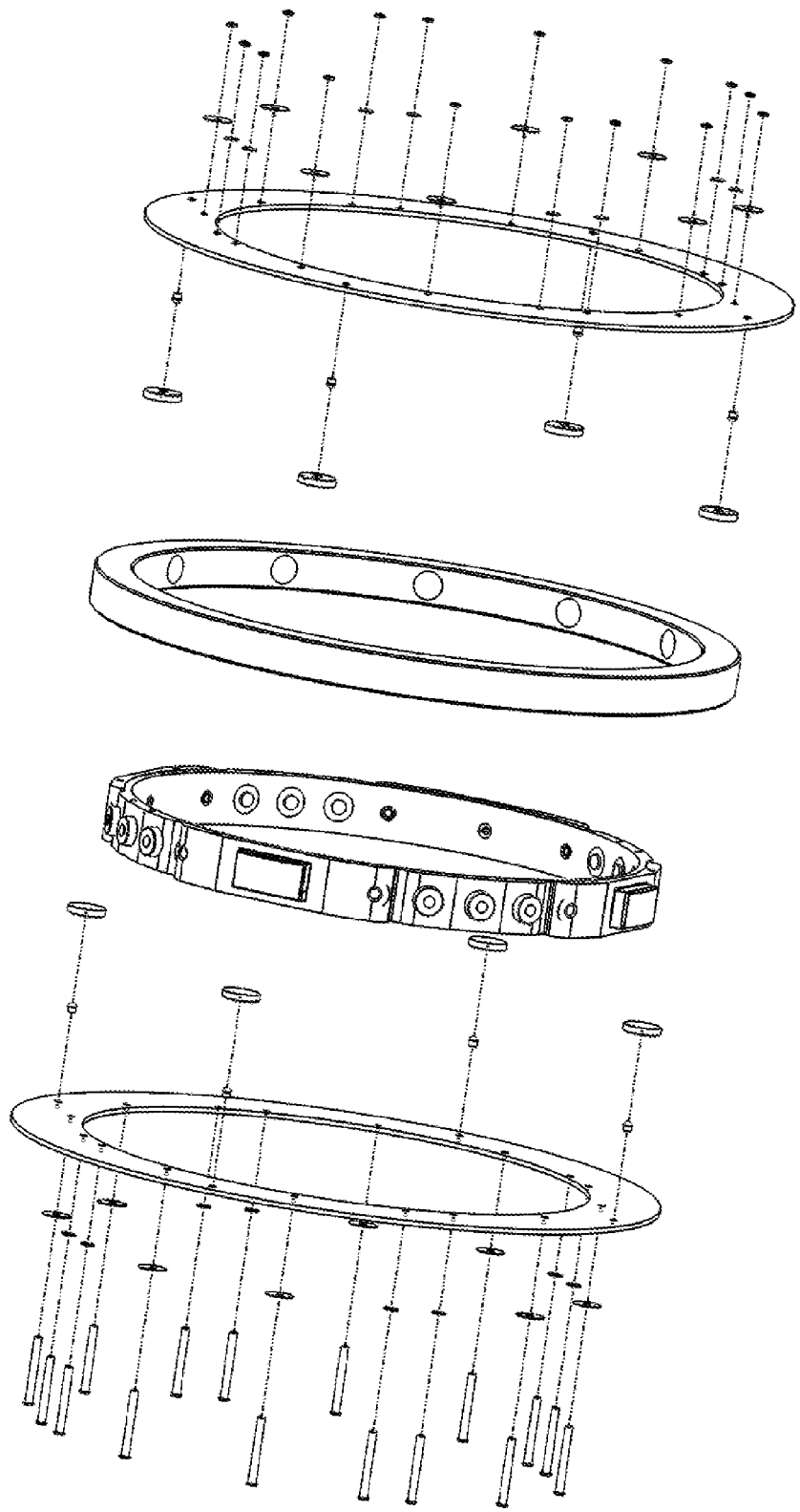
FIG. 42 is an exploded perspective view of various components used in a ring motor used in conjunction with a gyroscopic propulsion apparatus in accordance with a preferred embodiment of the present invention.

Referring now to FIG. 42, an exploded perspective view of various components used in a ring motor used in conjunction with a gyroscopic propulsion apparatus in accordance with a preferred embodiment of the present invention is depicted.

Figure 43:
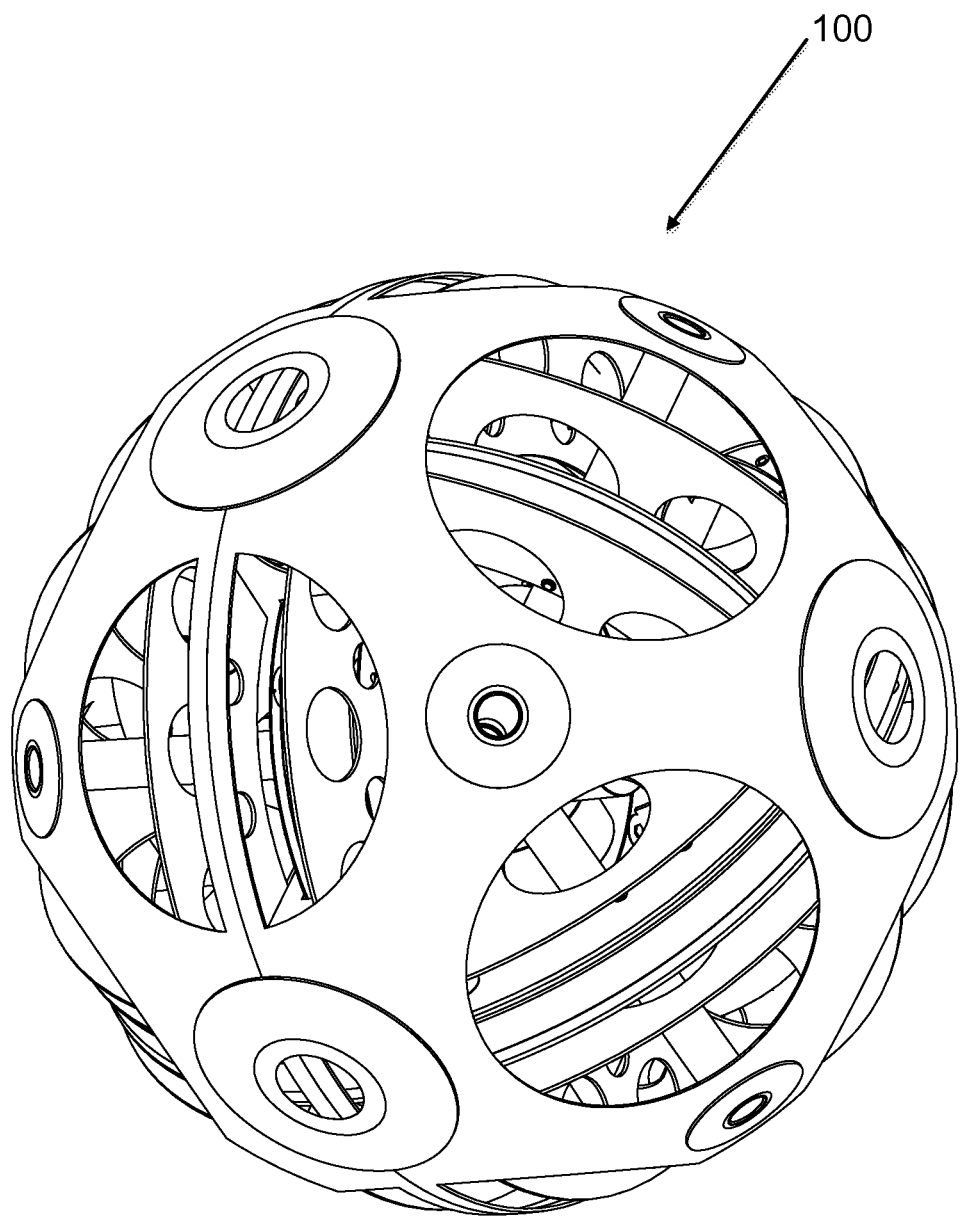
FIG. 43 is a perspective view of a gyroscopic propulsion apparatus in accordance with a preferred embodiment of the present invention.

Referring now to FIG. 43, a perspective view of gyroscopic propulsion apparatus 100 in accordance with a preferred embodiment of the present invention is depicted.

Figure 44:
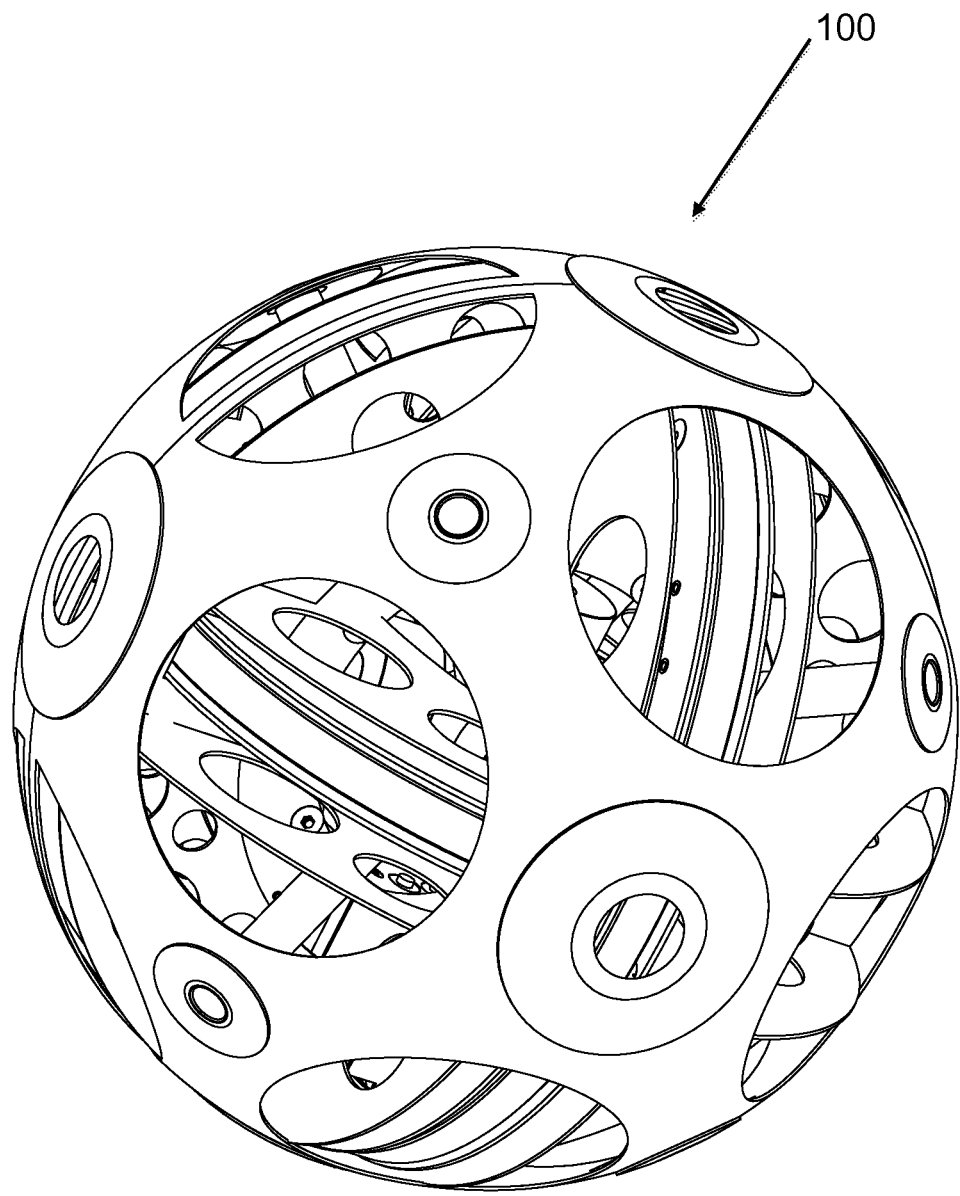
FIG. 44 is an alternative perspective view of the gyroscopic propulsion apparatus of FIG. 43.

Referring now to FIG. 44, an alternative perspective view of gyroscopic propulsion apparatus 100 of FIG. 43 is depicted.

Figure 45:
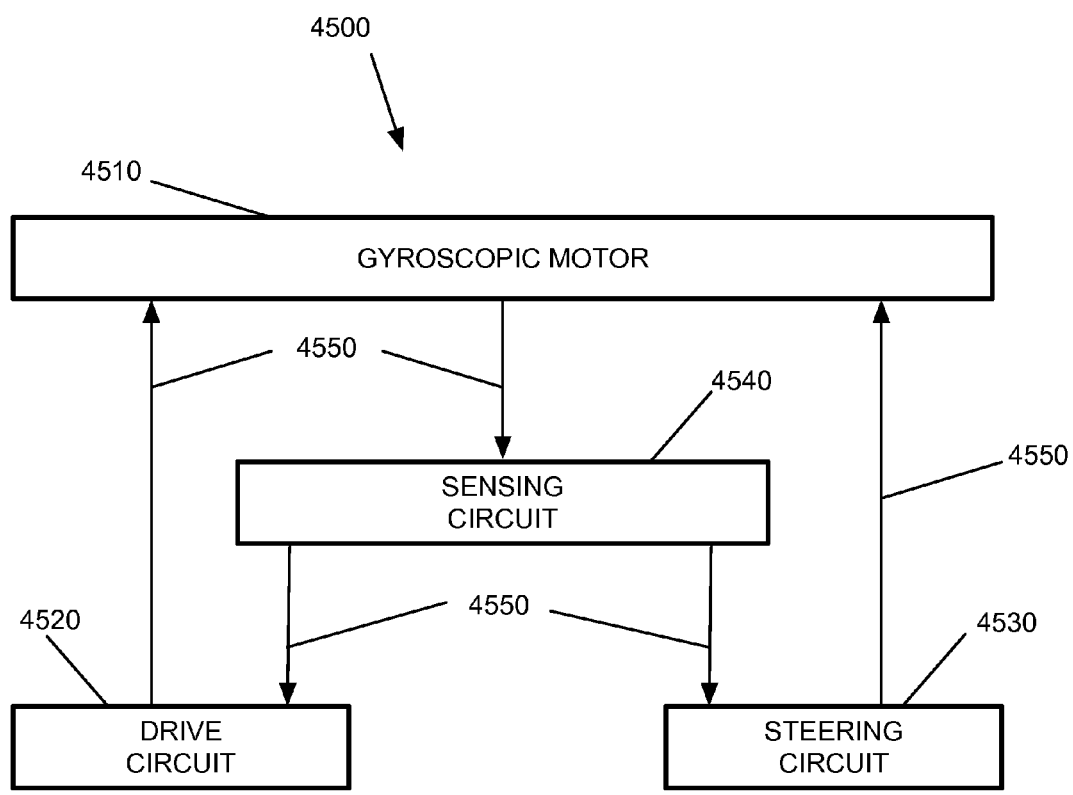
FIG. 45 is a block diagram for a control circuit suitable for use in conjunction with a gyroscopic propulsion apparatus in accordance with a preferred embodiment of the present invention.

Referring now to FIG. 45, a block diagram for a control circuit 4500 suitable for use in conjunction with a gyroscopic propulsion apparatus in accordance with a preferred embodiment of the present invention is depicted. Control circuit 4500 is most preferably controlled by one or more central processing units and will include additional control circuitry that is not shown in this FIG. For example, input from an operator will be received by control circuit 4500 and used to control the various components depicted in FIG. 45.

As shown in FIG. 45, the three gyroscopic motors are communicatively coupled to a sensing circuit 4540, a drive circuit 4520, and a steering circuit 4530 where each of these circuits are part of a control and guidance system comprising a combination of hardware and software configured to create a feedback loop for controlling the operation of the three gyroscopic motors. The most preferred embodiments of the present invention will also include a central processing unit or microprocessor that executes a control program where the control program is configured to control a direction of rotation and a rate of rotation for each of said three ring rotors. This will provide for control of the gyroscopic motors for applications such as vehicle propulsion where the gyroscopic motors are attached to or included in a vehicle and used as an engine for the vehicle.

Sensing circuit 4540 will monitor the speed, direction, position, etc. for each of the three gyroscopic rings for gyroscopic motor 4510 on a substantially continual basis while the gyroscopic propulsion apparatus is in operation. Sensing circuit 4540 will provide the monitored parameters to each of drive circuit 4520 and steering circuit 4530. In turn, each of drive circuit 4520 and steering circuit 4530 will provide input to gyroscopic motor 4510, controlling the speed, direction, position, etc. for each of the three gyroscopic rings for gyroscopic motor 4510. As previously explained, steering circuit 4530 controls a plurality of inner and outer steering coils that are configured to temporarily destabilize the rotor stability of one or more of the three gyroscopic ring rotors of gyroscopic motor 4510.

The magnetic field generated by the steering coils, whether generated by the inner or outer steering coils, can destabilize one or more of the ring rotors in that in the presence of the steering coil induced magnetic field, the ring rotor will lose its resistance to "tumbling" even though it is still spinning at high velocity. The resistance to tumbling while spinning is what creates the composite rotational inertia of the prototype and the equal force presence. The magnetic field generated by the steering coils alters this relationship, thus making it no longer equal in force presence. With the ability of the steering coils to be activated or actuated in many different combinations, the control program will have the ability to magnetically control the amount of secondary angular force on each of the spinning rotors and therefore affect how this will manifest in an effect on the trajectory of the gyroscopic apparatus as it pursues the path of least residence to and escape from torque in the environment. This will provide for the addition of a high precision of steering capability with a virtually instantaneous effect.

Figure 46:
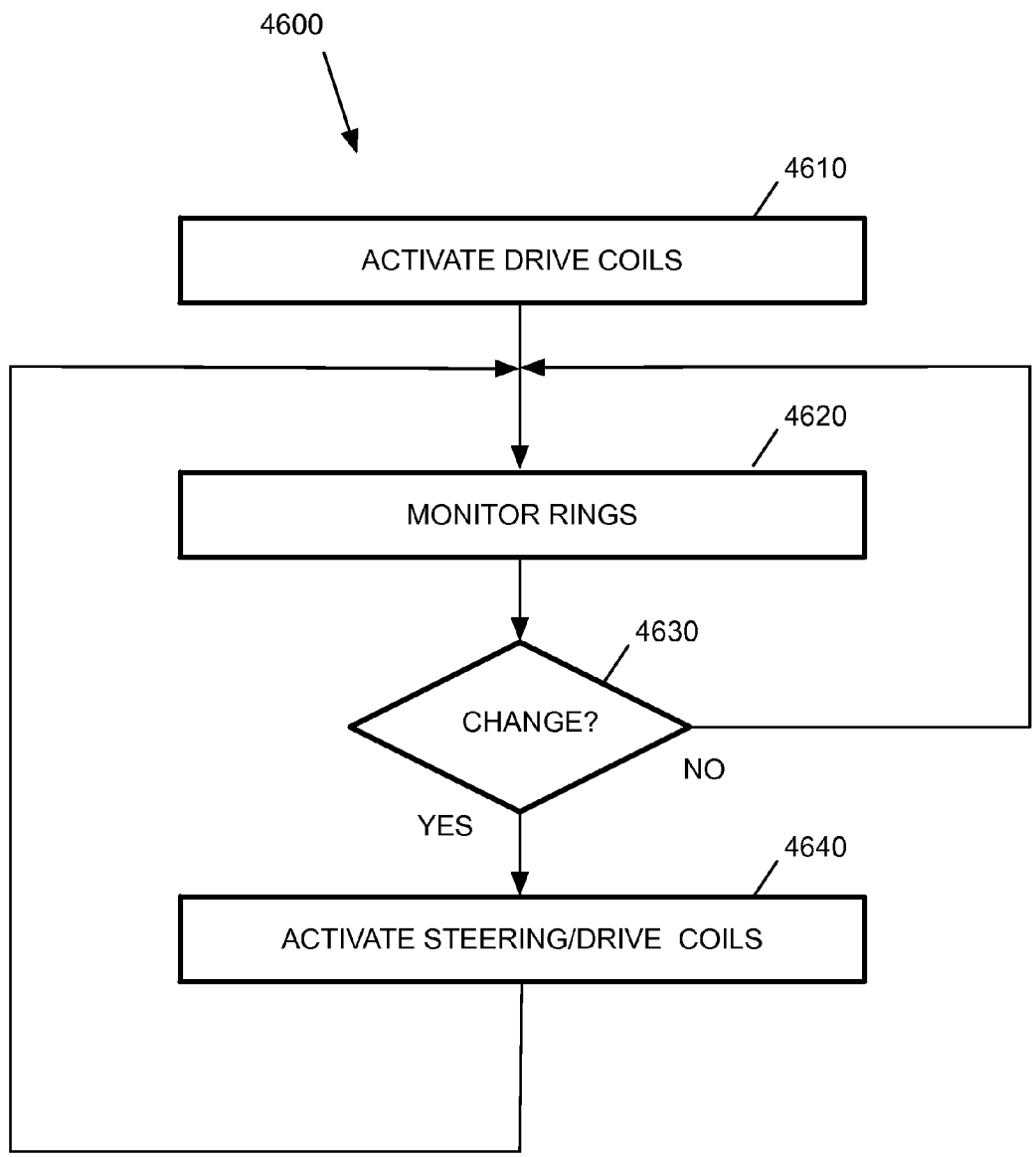
FIG. 46 is a flow chart for a method of operating a gyroscopic propulsion apparatus in accordance with a preferred embodiment of the present invention.

Referring now to FIG. 46, a flow chart for a method 4600 of operating a gyroscopic propulsion apparatus in accordance with a preferred embodiment of the present invention is depicted. As shown in FIG. 46, the drive coils are activated to start the ring motors spinning (step 4610). After the ring motors spin up and reach the desired RPMs, the sensing circuit will monitor the position, speed, and orientation for each of the three rings (step 4620). When a change in the direction or speed of the gyroscopic apparatus is desired (step 4630="YES"), then one or more of the steering coils, in conjunction with the drive coils, will be activated (4640 to achieve the desired change. As the change is being made, the rings will continuously be monitored (step 4620) until the desired change has been accomplished or until another change is indicated. If no change is desired (step 4630="NO"), then the control circuit will continue to monitor the rings (step 4620).

While the present invention has been particularly shown and described with reference to preferred exemplary embodiments thereof, it will be understood by those skilled in the art that various changes in form and details may be made therein without departing from the spirit and scope of the invention. For example, the exact number of windings used to create the brushless motors and the implementation of the control circuitry allow for many variations and equivalent embodiments without varying in significance. Similarly, the size of the various gyroscopic actuators or motors is limited only by the cost and manufacturing limitations associated with increasing the size of the gyroscopic actuators and the availability of suitable material for ensuring that the density of the rings creates the desired equal angular momentum for each gyroscopic ring at any given angular velocity. Further, more or fewer air bearings may be used in the various embodiments of the present invention without substantially altering the fundamental concepts set forth herein and more or fewer steering coils may be used without departing from the spirit and scope of the present invention.

The invention claimed is:

1. An apparatus comprising:
a first ring rotor rotating in a first plane, the first ring rotor generating a first angular momentum;
a second ring rotor rotating in a second plane, the second ring rotor generating a second angular momentum;
a third ring rotor rotating in a third plane, the third ring rotor generating a third angular momentum; and
a plurality of steering coils, the steering coils being configured to momentarily destabilize a magnetic field associated with at least one of the first ring rotor, the second ring rotor, and the third ring rotor.

2. The apparatus of claim 1 further comprising:
a plurality of copper plugs embedded into each of the first ring rotor, the second ring rotor, and the third ring rotor; and
a plurality of electromagnets configured to interact with the plurality of embedded copper plugs, thereby inducing an angular acceleration in each of the first ring rotor, the second ring rotor, and the third ring rotor.

3. The apparatus of claim 1 wherein the first plane is substantially perpendicular to the second plane and the third plane, the second plane is substantially perpendicular to the third plane, and the first, second, and third angular momentums are equal.

4. The apparatus of claim 1 wherein a control program is configured to actuate at least some of said plurality of steering coils, thereby destabilizing a magnetic field associated with at least one of the first ring rotor, the a second ring rotor, and the third ring rotor.

5. The apparatus of claim 1 wherein at least some of the plurality of steering coils are configured in pairs to create a controllable and varying magnetic field that is substantially parallel to an axis of least one of the first ring rotor, the second ring rotor, and the third ring rotor.

6. The apparatus of claim 1 further comprising:
a central hub;
a plurality of support spokes affixed to the central hub;
a containment sphere, the containment sphere containing the central hub, the first ring rotor, the second ring rotor, the third ring rotor, the plurality of support spokes, and at least some of the plurality of steering coils.

7. The apparatus of claim 1 further comprising a plurality of substantially flat support pieces arranged as a spherical support pedestal for each of the first ring rotor, the second ring rotor, and the third ring rotor.

8. The apparatus of claim 1 further comprising:
a control program; and
a control circuit, the control program and the control circuit being configured to control a plurality of functional characteristics for speed and direction each of the first ring rotor, the second ring rotor, and the third ring rotor.

9. The apparatus of claim 8 wherein the control circuit comprises:
a sensing circuit;
a drive circuit; and
a steering circuit.

10. An apparatus comprising:
a first ring rotor rotating in a first plane;
a second ring rotor rotating in a second plane;
a third ring rotor rotating in a third plane;
a plurality of steering coils, the steering coils being configured to momentarily destabilize a magnetic field associated with at least one of the first ring rotor, the a second ring rotor, and the third ring rotor;
a plurality of substantially flat support pieces arranged as a spherical support pedestal for each of the first ring rotor, the second ring rotor, and the third ring rotor;
a central hub;
a plurality of support spokes affixed to the central hub;
a sensing circuit;
a drive circuit; and
a steering circuit; and
a containment sphere, the containment sphere containing the central hub, the first ring rotor, the second ring rotor, the third ring rotor, the plurality of support spokes, and at least some of the plurality of steering coils, the spherical support pedestal, the sensing circuit, the drive circuit, and the steering circuit.

11. A method comprising the steps of:
rotating a first ring rotor in a first plane, the first ring rotor generating a first angular momentum;
rotating a second ring rotor rotating in a second plane, the second ring rotor generating a second angular momentum;
rotating a third ring rotor rotating in a third plane, the third ring rotor generating a third angular momentum; and
activating at least one of a plurality of steering coils, the at least one of a plurality of steering coils being configured to momentarily disrupt a magnetic field associated with at least one of the first ring rotor, the second ring rotor, and the third ring rotor.

12. The method of claim 11 wherein each of the first ring rotor, the a second ring rotor, and the third ring rotor comprise a plurality of copper plugs embedded into each of the first ring rotor, the second ring rotor, and the third ring rotor and further comprising the step of energizing a plurality of electromagnets configured to interact with the plurality of embedded copper plugs, thereby inducing an angular acceleration in each of the first ring rotor, the second ring rotor, and the third ring rotor.

13. The method of claim 11 wherein the first plane is substantially perpendicular to the second plane and the third plane, the second plane is substantially perpendicular to the third plane, and the first, second, and third angular momentums are equal.

14. The method of claim 11 further comprising the step of activating a control program to energize at least some of the plurality of steering coils, thereby destabilizing a magnetic field associated with at least one of the first ring rotor, the a second ring rotor, and the third ring rotor.

15. The method of claim 11 wherein at least some of the plurality of steering coils are configured in pairs to create a controllable and varying magnetic field that is substantially parallel to an axis of least one of the first ring rotor, the second ring rotor, and the third ring rotor.

16. The method of claim 11 further comprising the steps of:
affixing the first ring rotor, the second ring rotor, and the third ring rotor to a vehicle; and
controlling the vehicle by selectively energizing and de-energizing at least some of the plurality of steering coils.

17. The method of claim 11 further comprising the step of supporting each of the first ring rotor, the second ring rotor, and the third ring rotor with a plurality of substantially flat support pieces, the plurality of substantially flat support pieces being arranged as a spherical support pedestal.

18. The method of claim 11 further comprising the step of activating a control program and a control circuit, the control program and the control circuit being configured to control a plurality of functional characteristics for speed and direction each of the first ring rotor, the second ring rotor, and the third ring rotor.

19. The method of claim 18 wherein the control circuit comprises:
a sensing circuit;
a drive circuit; and
a steering circuit.

* * * * *